(12) United States Patent
Oya et al.

(10) Patent No.: US 12,383,444 B2
(45) Date of Patent: Aug. 12, 2025

(54) CONTROL DEVICE OF VEHICLE, VEHICLE, AND METHOD OF ACTIVATING DOOR TO OPEN AND CLOSE AND SLOPE PLATE TO DEPLOY

(71) Applicant: TOYOTA JIDOSHA KABUSHIKI KAISHA, Toyota (JP)

(72) Inventors: Kentaro Oya, Toyota (JP); Ryo Kanda, Nissin (JP); Seiji Kanda, Miyoshi (JP); Masaaki Tanaka, Toyota (JP); Naoya Ishida, Chiryu (JP); Chihiro Date, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 890 days.

(21) Appl. No.: 17/570,807

(22) Filed: Jan. 7, 2022

(65) Prior Publication Data

US 2022/0218541 A1    Jul. 14, 2022

(30) Foreign Application Priority Data

Jan. 13, 2021 (JP) ................................ 2021-003189
Aug. 10, 2021 (JP) ................................ 2021-130947

(51) Int. Cl.
*A61G 3/06* (2006.01)
*B60P 1/43* (2006.01)

(52) U.S. Cl.
CPC ............. *A61G 3/061* (2013.01); *A61G 3/065* (2013.01); *A61G 3/067* (2016.11); *B60P 1/431* (2013.01)

(58) Field of Classification Search
CPC ........ A61G 3/061; A61G 3/067; A61G 3/065; B60P 1/431
See application file for complete search history.

(56) References Cited

U.S. PATENT DOCUMENTS

| | | | |
|---|---|---|---|
| 6,825,628 B2* | 11/2004 | Heigl | H02H 7/0851 414/921 |
| 7,735,839 B1* | 6/2010 | Schlangen | B60P 1/027 280/6.151 |
| 2009/0085370 A1* | 4/2009 | Bartel | A61G 3/065 296/178 |
| 2011/0068566 A1* | 3/2011 | Bartel | B62D 31/02 280/788 |
| 2019/0083334 A1* | 3/2019 | MacPherson | A61G 3/061 |
| 2019/0193620 A1 | 6/2019 | Matsuoka et al. | |
| 2020/0262326 A1 | 8/2020 | Honda et al. | |

(Continued)

FOREIGN PATENT DOCUMENTS

| | | |
|---|---|---|
| JP | 2019-116112 A | 7/2019 |
| JP | 2020-131784 A | 8/2020 |

*Primary Examiner* — Abigail A Risic
(74) *Attorney, Agent, or Firm* — Dinsmore & Shohl LLP

(57) ABSTRACT

A control device of a vehicle is installed in a vehicle including: a body having a vehicle cabin and a floor panel constituting a floor of the vehicle cabin; a door opening-closing mechanism that drives a door mounted on the body to open and close; and a slope deploying mechanism that deploys a slope plate housed under the floor panel to the outside of the body. The control device coordinates the operation of the door opening-closing mechanism and the slope deploying mechanism. The control device opens the door by the door opening-closing mechanism after deploying the slope plate toward the outside of the body by the slope deploying mechanism.

6 Claims, 19 Drawing Sheets

(56) References Cited

U.S. PATENT DOCUMENTS

| | | | |
|---|---|---|---|
| 2021/0000666 A1* | 1/2021 | Smith | B60P 1/431 |
| 2021/0245650 A1* | 8/2021 | Tomioka | A61G 3/061 |
| 2022/0218541 A1* | 7/2022 | Oya | A61G 3/065 |
| 2022/0219589 A1* | 7/2022 | Ishida | B60P 1/431 |
| 2022/0409451 A1* | 12/2022 | Lee | A61G 3/067 |
| 2023/0092127 A1* | 3/2023 | Cho | B60K 1/04 14/71.1 |

* cited by examiner

VIEW B-B

CONTROL DEVICE OF VEHICLE, VEHICLE, AND METHOD OF ACTIVATING DOOR TO OPEN AND CLOSE AND SLOPE PLATE TO DEPLOY

CROSS-REFERENCE TO RELATED APPLICATION

This application claims priority to Japanese Patent Application No. 2021-003189 filed on Jan. 13, 2021, incorporated herein by reference in its entirety.

BACKGROUND

1. Technical Field

The present disclosure relates to a configuration of a control device that is installed in a vehicle including a door and a slope plate to open and close the door and deploy the slope plate, a structure of a vehicle equipped with this control device, and a method of activating a door to open and close and a slope plate to deploy in a vehicle.

2. Description of Related Art

Recently, a structure has been disclosed in which a slope device is housed under an entrance of a vehicle and a slope plate is deployed to a lateral side of the vehicle to allow people in wheelchairs to get on and out of the vehicle more easily (e.g., see Japanese Unexamined Patent Application Publication No. 2019-116112 (JP 2019-116112 A)).

SUMMARY

In the electric vehicle described in JP 2019-116112 A, an opening through which the slope plate is deployed to the lateral side of the vehicle is covered by the door when the door is closed, and therefore the slope plate is deployed after the door is opened. Thus, there is a possibility that passengers may come into contact with the slope plate while the slope plate is deploying.

The present disclosure aims to reduce the likelihood that passengers may come into contact with a slope plate while the slope plate is deploying.

A control device of a vehicle of the present disclosure is installed in a vehicle including: a body having a vehicle cabin in which a passenger rides and a floor panel constituting a floor of the vehicle cabin; a door opening-closing mechanism that drives a door mounted on the body to open and close; and a slope deploying mechanism that deploys a slope plate housed under the floor panel to the outside of the body. The control device coordinates the operation of the door opening-closing mechanism and the slope deploying mechanism. The control device opens the door by the door opening-closing mechanism after deploying the slope plate toward the outside of the body by the slope deploying mechanism.

Thus, the door is opened after the slope plate is deployed, which can reduce the likelihood that passengers may come into contact with the slope plate while the slope plate is deploying.

The control device of the vehicle of the present disclosure may deploy the slope plate to the outside of the body by the slope deploying mechanism to eject the slope plate, push the door out toward the outside by the door opening-closing mechanism to slightly open the door, then immediately raise the slope plate by the slope deploying mechanism until an upper surface of a body-side end of the slope plate reaches the level of an upper surface of the floor panel, ground a leading end of the slope plate, and then fully open the door by the door opening-closing mechanism.

Thus, the door is fully opened after the positions of the leading end and the body-side end of the slope plate are established, which can reduce the likelihood that passengers may start to cross the slope plate before the position of the slope plate is established. In the control device of the vehicle of the present disclosure, either one of the two actions of ejecting the slope plate and slightly opening the door may be performed first or both actions may be performed at the same time.

The control device of the vehicle of the present disclosure may be installed in the vehicle that further includes a ground clearance adjusting mechanism that adjusts the ground clearance. When deploying the slope plate to the outside of the body by the slope deploying mechanism, the control device may reduce the ground clearance by the ground clearance adjusting mechanism.

Since the slope plate is deployed and the ground clearance is adjusted at the same time, even when the ground clearance needs to be adjusted, the time from when the vehicle stops until passengers start to get on and out of the vehicle can be shortened.

When deploying the slope plate to the outside of the body by the slope deploying mechanism, the control device of the vehicle of the present disclosure may reduce the ground clearance by the ground clearance adjusting mechanism before the position of the center of gravity of the slope plate is sent out to the outside of the body.

Since the ground clearance is adjusted with the leading end of the slope floating without being grounded, the action of deploying the slope plate and the action of adjusting the ground clearance are less likely to interfere with each other.

The control device of the vehicle of the present disclosure may deploy the slope plate to the outside of the body by the slope deploying mechanism and, at the same time, reduce the ground clearance by the ground clearance adjusting mechanism to eject the slope plate, push the door out toward the outside by the door opening-closing mechanism to slightly open the door, then immediately raise the slope plate by the slope deploying mechanism until an upper surface of a body-side end of the slope plate reaches the level of an upper surface of the floor panel, ground a leading end of the slope plate, and then fully open the door by the door opening-closing mechanism.

Since the slope plate is deployed and the ground clearance is adjusted at the same time, even when the ground clearance needs to be adjusted, the time from when the vehicle stops until passengers start to get on and out of the vehicle can be shortened. Moreover, since the door is fully opened after the positions of the leading end and the body-side end of the slope plate are established, passengers are less likely to start to cross the slope plate before the position of the slope plate is established.

A vehicle of the present disclosure includes: a body having a vehicle cabin in which a passenger rides and a floor panel constituting a floor of the vehicle cabin; a door opening-closing mechanism that drives a door mounted on the body to open and close; a slope deploying mechanism that deploys a slope plate housed under the floor panel to the outside of the body; and a control device that coordinates the operation of the door opening-closing mechanism and the slope deploying mechanism. The control device opens the door by the door opening-closing mechanism after deploying the slope plate toward the outside of the body by the slope deploying mechanism.

In the vehicle of the present disclosure, the control device may deploy the slope plate to the outside of the body by the slope deploying mechanism to eject the slope plate, push the door out toward the outside by the door opening-closing mechanism to slightly open the door, then immediately raise the slope plate by the slope deploying mechanism until an upper surface of a body-side end of the slope plate reaches the level of an upper surface of the floor panel, ground a leading end of the slope plate, and then fully open the door by the door opening-closing mechanism. In the vehicle of the present disclosure, the control device may perform either one of the two actions of ejecting the slope plate and slightly opening the door first or perform both actions at the same time.

A method of activating a door to open and close and a slope plate to deploy of the present disclosure is a method of activating a door to open and close and a slope plate to deploy in a vehicle including: a body having a vehicle cabin in which a passenger rides and a floor panel constituting a floor of the vehicle cabin; a door opening-closing mechanism that drives a door mounted on the body to open and close; and a slope deploying mechanism that deploys a slope plate housed under the floor panel to the outside of the body. The method involves opening the door by the door opening-closing mechanism after deploying the slope plate toward the outside of the body by the slope deploying mechanism.

The method of activating a door to open and close and a slope plate to deploy of the present disclosure may involve deploying the slope plate to the outside of the body by the slope deploying mechanism to eject the slope plate, pushing the door out toward the outside by the door opening-closing mechanism to slightly open the door, then immediately raising the slope plate by the slope deploying mechanism until an upper surface of a body-side end of the slope plate reaches the level of an upper surface of the floor panel, grounding a leading end of the slope plate, and then fully opening the door by the door opening-closing mechanism. In the method of activating a door to open and close and a slope plate to deploy of the present disclosure, either one of the two actions of ejecting the slope plate and slightly opening the door may be performed first or both actions may be performed at the same time.

The present disclosure can reduce the likelihood that passengers may come into contact with a slope plate while the slope plate is deploying.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
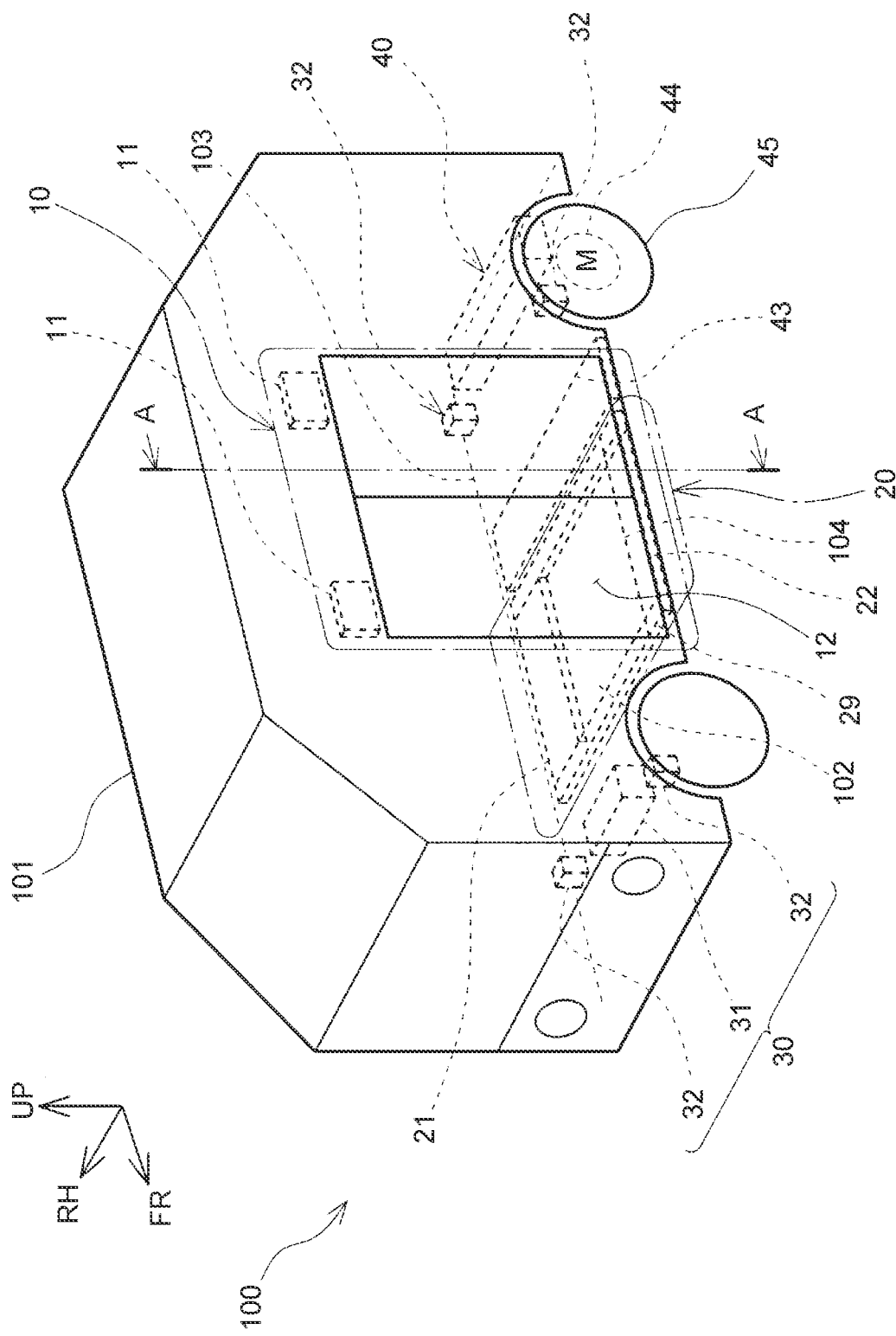
FIG. 1 is a perspective view of a vehicle equipped with a control device of an embodiment.

A vehicle 100 and a control device 40 installed in the vehicle 100 of an embodiment will be described below with reference to the drawings. Arrows FR, UP, RH shown in the drawings indicate a frontward direction (advancing direction), an upward direction, and a rightward direction, respectively, of the vehicle 100. Directions opposite to the arrows FR, UP, RH indicate a rearward direction, a downward direction, and a leftward direction, respectively, of the vehicle. Unless otherwise noted, the directions front and rear, right and left, and up and down used alone in the following description mean front and rear in a vehicle front-rear direction, right and left in a vehicle right-left direction (vehicle width direction), and up and down in a vehicle height direction.

The vehicle 100 will be described as an electric vehicle in the following description, but the vehicle 100 is not limited thereto. As shown in FIG. 1, the vehicle 100 includes a body 101, a door device 10, a slope device 20, a ground clearance adjusting device 30, the control device 40, a driving motor 44, a battery 43, and wheels 45. FIG. 1 shows a state where a door 12 of the vehicle 100 is closed and a slope plate 22 is housed.

The body 101 includes a vehicle cabin 102 which is symmetrical in the front-rear direction and in which passengers ride, and a floor panel 103 that constitutes a floor of the vehicle cabin 102. The floor panel 103 of the vehicle cabin 102 is flat and seats (not shown) for passengers to sit on are disposed inside the vehicle cabin 102. A part between a left-side end of the floor panel 103 and an inner surface of the door 12 forms a step part 104 (see FIG. 2) of which the level of an upper surface lowers from a front surface of the floor panel 103 toward the door 12. The control device 40 is installed inside the body 101.

The door device 10 is composed of the double door 12 that is provided on a side surface of the body 101 and slides along the side surface of the body 101, and door opening-closing mechanisms 11 that open and close the door 12. The door 12 is hung at an upper part, and one door opening-closing mechanism 11 is mounted at the upper part of each half of the double door 12. The door opening-closing mechanism 11 includes a motor and a gear or a link. The door opening-closing mechanism 11 detects the degree of opening of the door 12 based on the position of the motor or the gear and outputs the detected degree of opening to an outside.

The slope device 20 is provided under the floor panel 103. The slope device 20 will be described in detail later with reference to FIG. 2. The ground clearance adjusting device 30 is composed of hydraulic cylinders 32 that are each mounted between a suspension (not shown) of a corresponding wheel 45 and a structural member (not shown) under the body 101, and a ground clearance adjusting mechanism 31 that sends control oil to the hydraulic cylinders 32. The ground clearance adjusting device 30 adjusts the ground clearance of the vehicle 100 as the ground clearance adjusting mechanism 31 adjusts the levels of the hydraulic cylinders 32. The ground clearance adjusting mechanism 31 calculates the ground clearance based on the levels of the hydraulic cylinders 32 and outputs the calculated ground clearance to the outside. Instead of the hydraulic cylinders 32, the ground clearance adjusting device 30 may include pneumatic cylinders.

The battery 43 is disposed next to the slope device 20 under the floor panel 103. The driving motor 44 of the vehicle 100 is an in-wheel motor built inside the wheel 45. Instead of being an in-wheel motor, the driving motor 44 may drive the wheel 45 by being installed in the body 101.

Next, the detailed configuration of the slope device 20 will be described with reference to FIG. 2. The slope device 20 is composed of a slope plate 22 that is deployed toward an outside of the body 101 in the vehicle width direction, a casing 29 that houses the slope plate 22, and a slope deploying mechanism 21 that deploys and retracts the slope plate 22. The casing 29 is a thin box mounted on rockers 105 that are disposed under the floor panel 103, on both sides of the body 101, and an opening 29a through which the slope plate 22 is moved in and out is provided at an end of the casing 29 on the vehicle left side where the door 12 is provided.

The slope deploying mechanism 21 is composed of a slider main body 24, a connection body 23, a rotary link 28, and a connection bar 27. The slider main body 24 has rollers 25, 26 mounted at ends thereof on the vehicle left side and the vehicle right side that are ends in a deploying direction of the slope plate 22, so as to be rotatable relatively to the slider main body 24. The roller 25 at the end on the vehicle left side is mounted on the lower side relatively to the center of the slider main body 24 in the up-down direction, and a lower side of the roller 25 is in contact with an inner surface of a bottom plate 29c of the casing 29. Meanwhile, the roller 26 at the end on the vehicle right side is mounted on the slider main body 24 such that an upper side of the roller 26 is in contact with an inner surface of a top plate 29b of the casing 29. The slider main body 24 is connected to a motor and a gear device that are disposed inside the casing 29, and moves in the vehicle width direction as the motor rotates. The motor and the gear device are not shown. The slope deploying mechanism 21 detects the position of deployment of the slope plate 22 based on the position of the motor or the gear and outputs the detected position of deployment to the outside.

The connection body 23 is mounted at the vehicle right side on the slider main body 24 so as to be movable in the vehicle width direction relatively to the slider main body 24. The rotary link 28 is rotatably mounted with a pin 28a at an end of the connection body 23 on the vehicle left side. A body-side end 22b of the slope plate 22 is rotatably connected with a pin 28c to a left-side end of the rotary link 28. A right-side end of the rotary link 28 and a left-side end of the slider main body 24 are connected to each other by the connection bar 27. A left-side end of the connection bar 27 is rotatably connected with a pin 28b to the right-side end of the rotary link 28.

The slope plate 22 is a plate-shaped member and is connected at the body-side end 22b to the slider main body 24 through the rotary link 28 and the connection body 23. A leading end 22a of the slope plate 22 has a smaller plate thickness.

Figure 2:
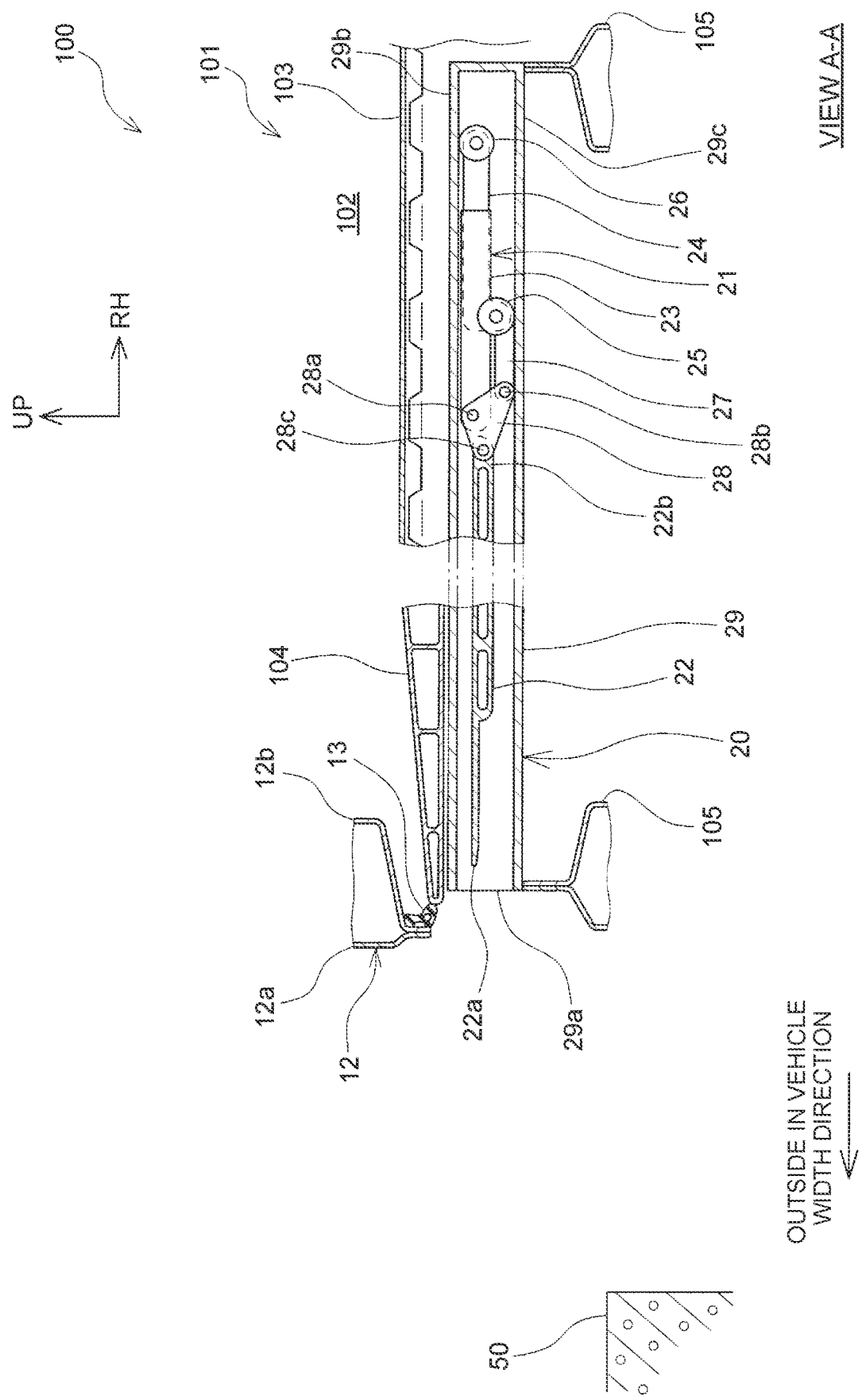
FIG. 2 is a sectional view showing details of a slope deploying mechanism installed in the vehicle shown in FIG. 1, and is a section taken along line A-A shown in FIG. 1.

As shown in FIG. 2, the door 12 is composed of a door outer panel 12a and a door inner panel 12b, and a weather seal 13 is mounted at a lower end of the door 12. A lip of the weather seal 13 is disposed so as to be located on the upper side relatively to the top plate 29b of the casing 29 of the slope device 20, and in a state where the door 12 is closed, a tip of the lip of the weather seal 13 is in contact with a left-side end of the step part 104 of the floor panel 103. Thus, the slope plate 22 can be deployed to the outside in the vehicle width direction with the door 12 closed.

Figure 3:
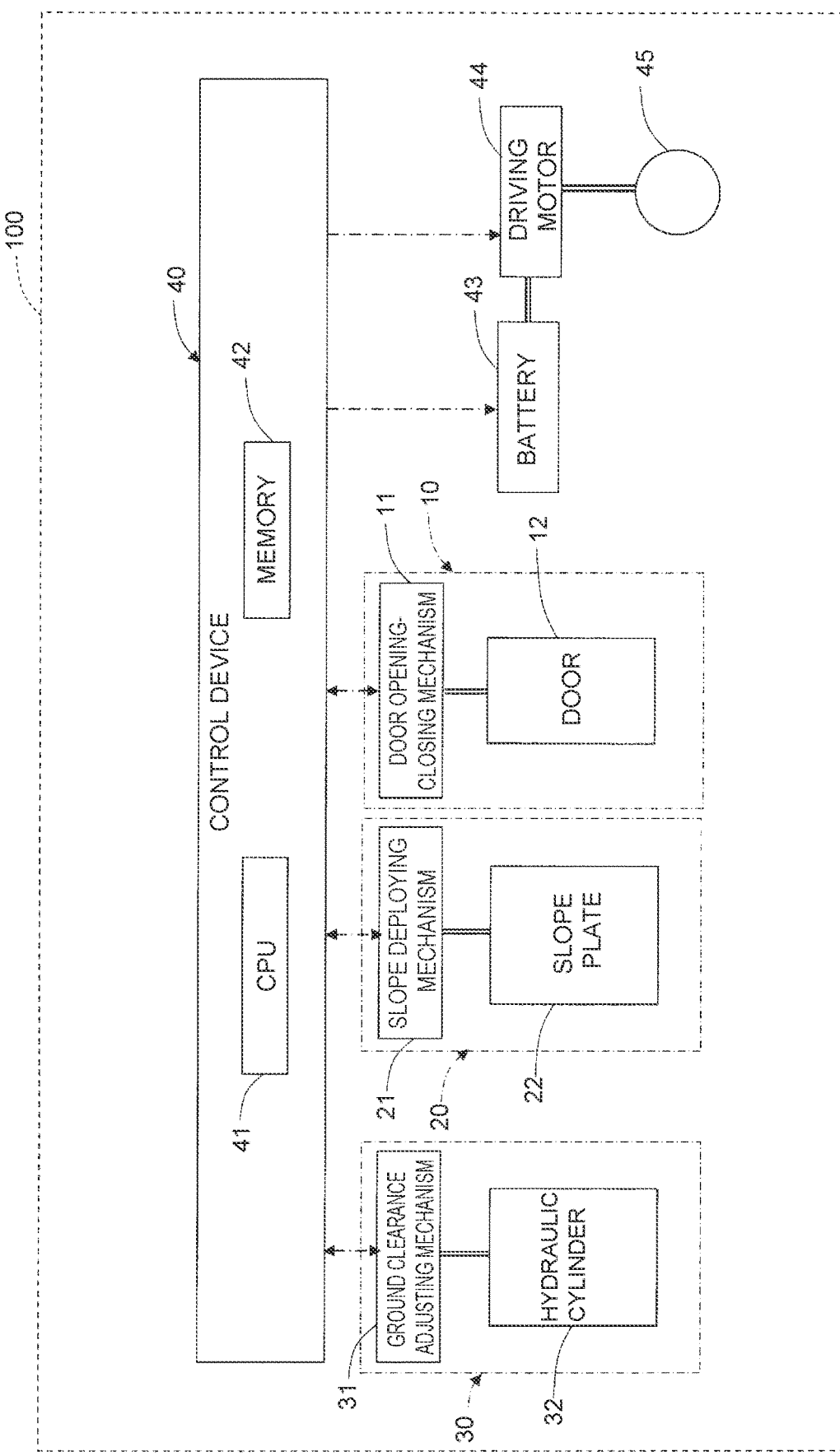
FIG. 3 is a system diagram showing the configuration of a control system of the vehicle shown in FIG. 1.

As shown in FIG. 3, the door opening-closing mechanism 11, the slope deploying mechanism 21, the ground clearance adjusting mechanism 31, the battery 43, and the driving motor 44 are connected to the control device 40 and operate in accordance with commands from the control device 40. Data on the degree of opening of the door output by the door opening-closing mechanism 11, data on the position of deployment of the slope output by the slope deploying mechanism 21, and data on the ground clearance output by the ground clearance adjusting mechanism 31 are input into the control device 40.

The control device 40 is a computer internally including a CPU 41 that processes information and a memory 42 that stores control programs, control data, etc.

Next, the operation of the control device 40 installed in the vehicle 100 will be described with reference to FIG. 4 to FIG. 12.

Figure 4:
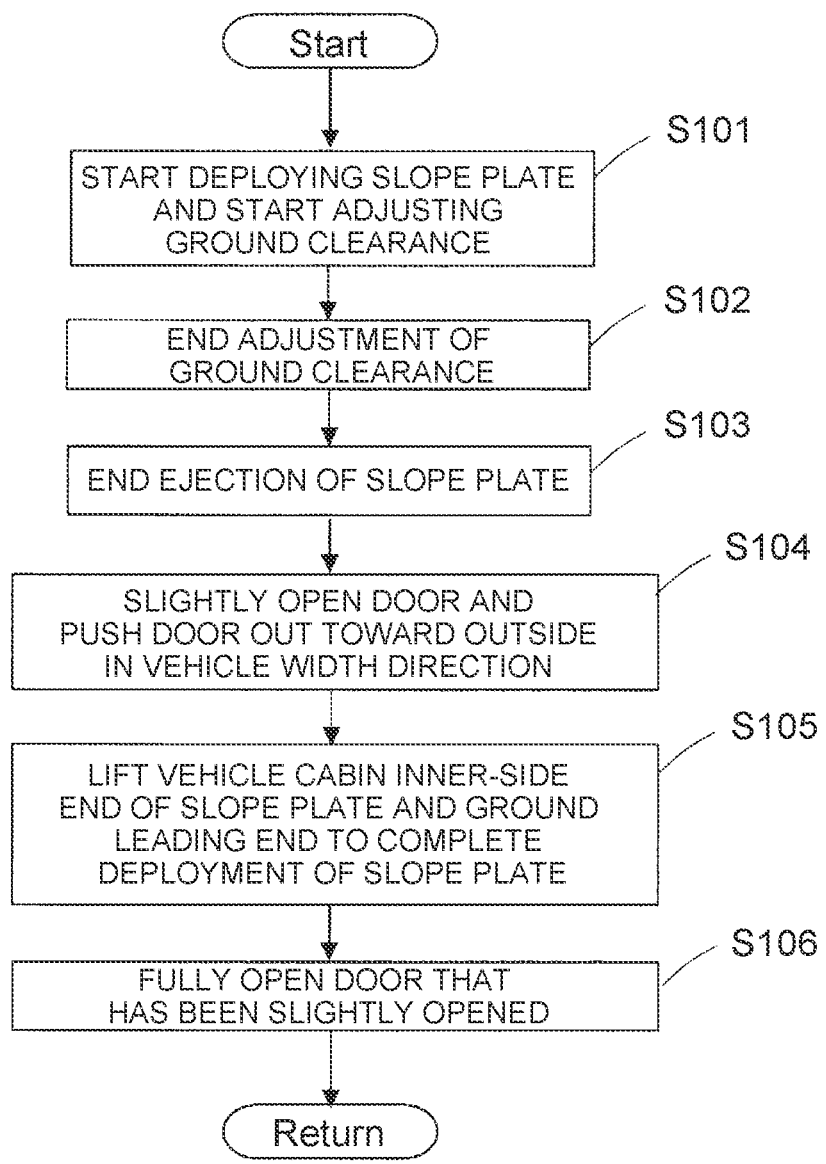
FIG. 4 is a flowchart showing an action of deploying a slope, an action of adjusting a ground clearance, and an action of opening a door that are performed by the control device of the vehicle of the embodiment.
Figure 5:
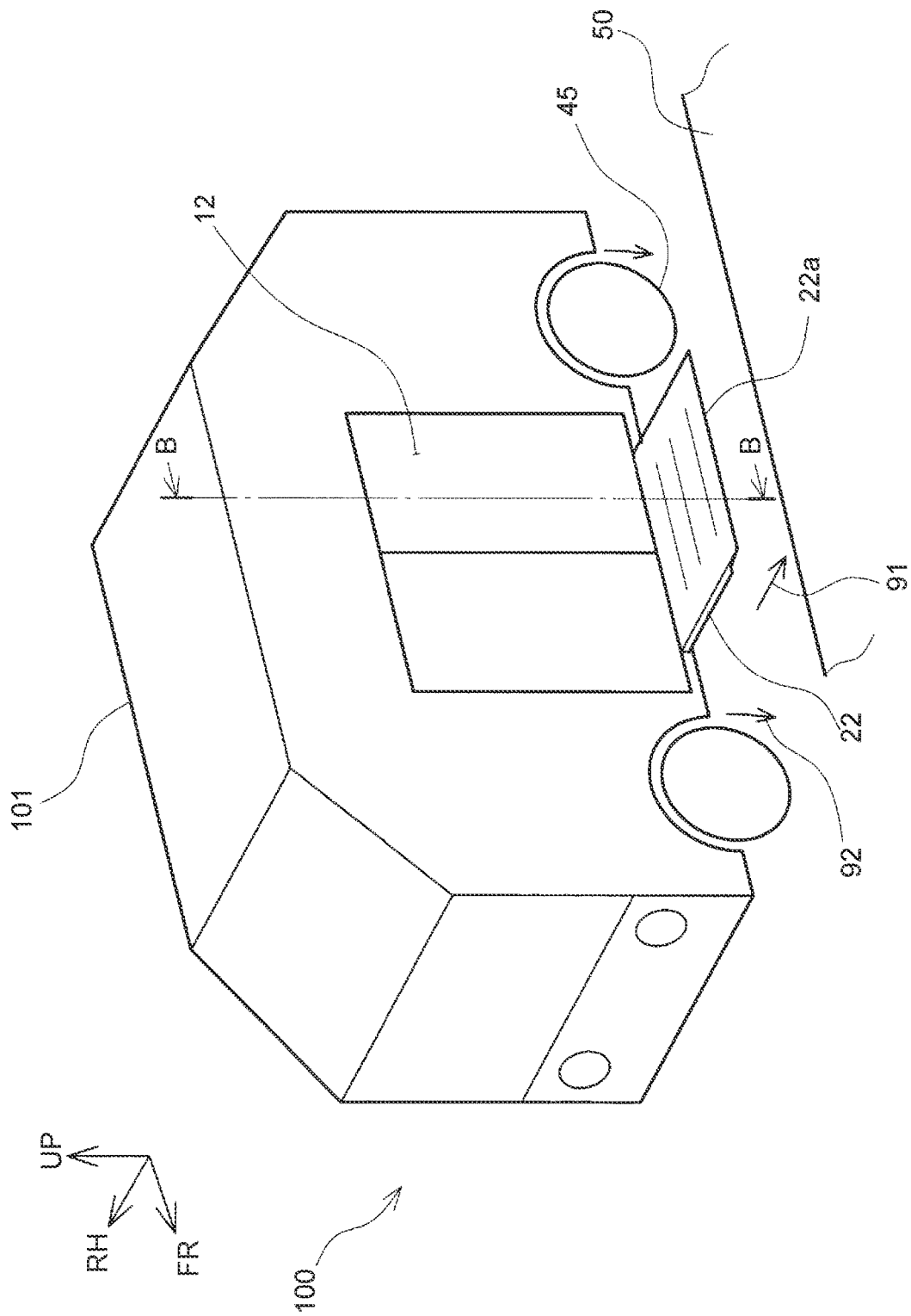
FIG. 5 is a perspective view showing a state where a slope plate is being deployed and the ground clearance is being adjusted in the vehicle shown in FIG. 1.
Figure 6:
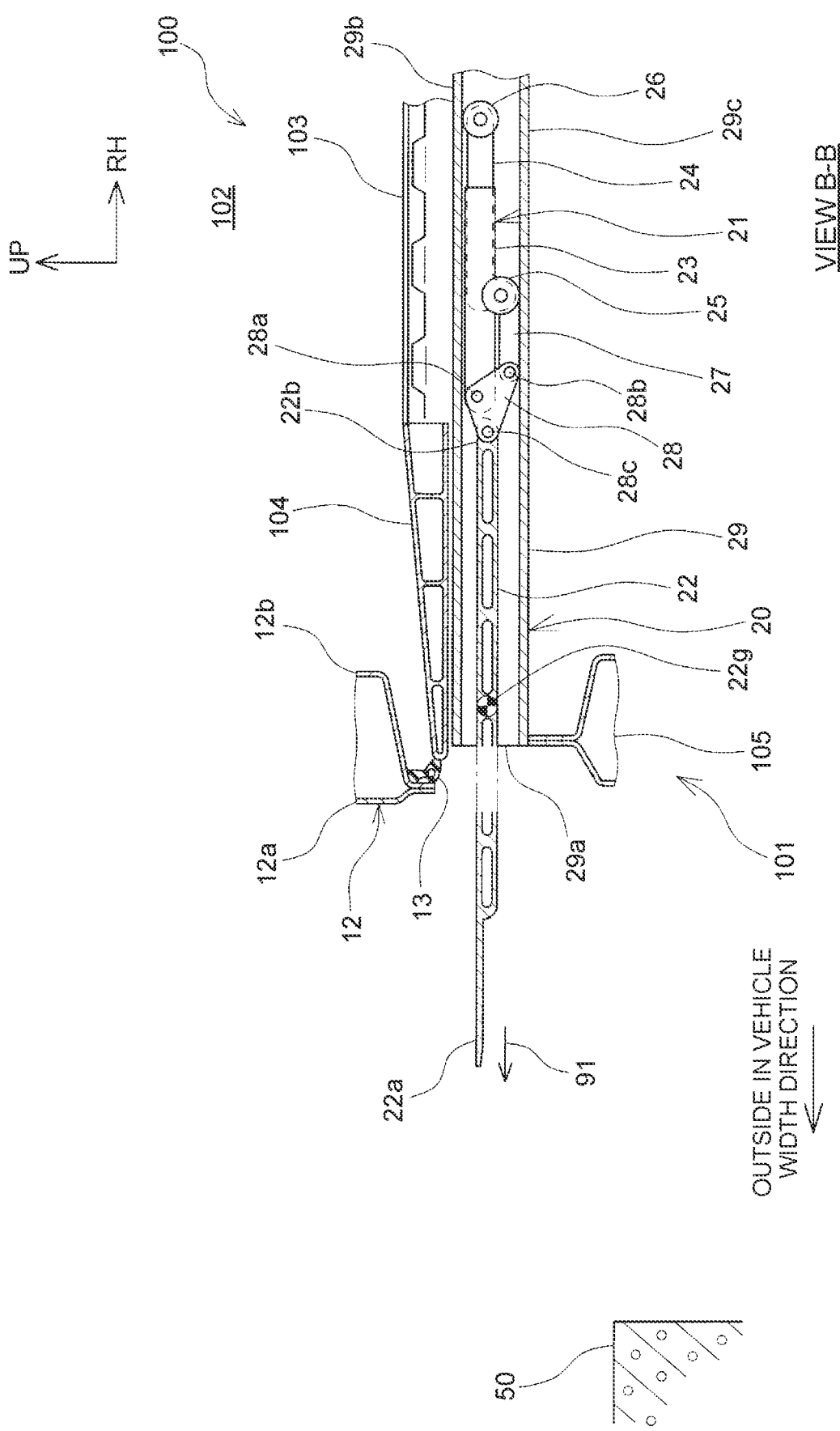
FIG. 6 is a sectional view taken along line B-B shown in FIG. 5.

When the vehicle 100 stops at a predetermined place, such as a bus stop, where passengers get on and out of the vehicle 100, as shown in step S101 of FIG. 4, the CPU 41 of the control device 40 outputs a command for starting to deploy the slope plate 22 to the slope deploying mechanism 21. Further, the CPU 41 of the control device 40 outputs a command for reducing the ground clearance of the vehicle 100 to the ground clearance adjusting mechanism 31. In accordance with the command from the control device 40, the slope deploying mechanism 21 drives a built-in motor to move the slider main body 24 toward the vehicle left side as shown in FIG. 5 and FIG. 6. Here, the slider main body 24 and the connection body 23 are prevented by a lock mechanism (not shown) from moving relatively to each other in the vehicle width direction, and the slider main body 24 and the connection body 23 move integrally toward the vehicle left side. When the slider main body 24 and the connection body 23 have moved toward the left side, as indicated by arrow 91 in FIG. 5 and FIG. 6, the leading end 22a of the slope plate 22 is sent out through the opening 29a of the casing 29 toward the outside in the vehicle width direction. Thus, the slope plate 22 is ejected toward the outside in the vehicle width direction. While a position 22g of the center of gravity of the slope plate 22 in the vehicle width direction is inside the casing 29, the slope plate 22 is deployed substantially horizontally toward the outside in the vehicle width direction. During this process, the slope deploying mechanism 21 outputs a signal indicating the position of deployment of the slope plate 22 to the control device 40, and the control device 40 ejects and deploys the slope plate 22 while detecting the position of deployment of the slope plate 22.

Meanwhile, the ground clearance adjusting mechanism 31 reduces the oil pressures of the hydraulic cylinders 32 and lowers the levels of the hydraulic cylinders 32 in accordance with the command from the control device 40. During this process, the ground clearance adjusting mechanism 31 detects the ground clearance and outputs the detected ground clearance to the control device 40, and the control device 40 reduces the ground clearance as indicated by arrows 92 in FIG. 5 while detecting the ground clearance. When the ground clearance has been reduced to a predetermined clearance, the control device 40 ends the adjustment of the ground clearance as shown in step S102 of FIG. 4.

The time taken to adjust the ground clearance is about one third of the time taken to deploy the slope plate 22. Therefore, when the control device 40 has adjusted the ground clearance by the ground clearance adjusting mechanism 31, about one third of the slope plate 22 has been ejected through the opening 29a of the casing 29 to the outside in the vehicle width direction while about two thirds thereof are still housed inside the casing 29. Thus, as shown in FIG. 6, when the ground clearance has been adjusted, the position 22g of the center of gravity of the slope plate 22 is located inside the casing 29 and the slope plate 22 is being deployed substantially horizontally toward the outside in the vehicle width direction.

Figure 7:
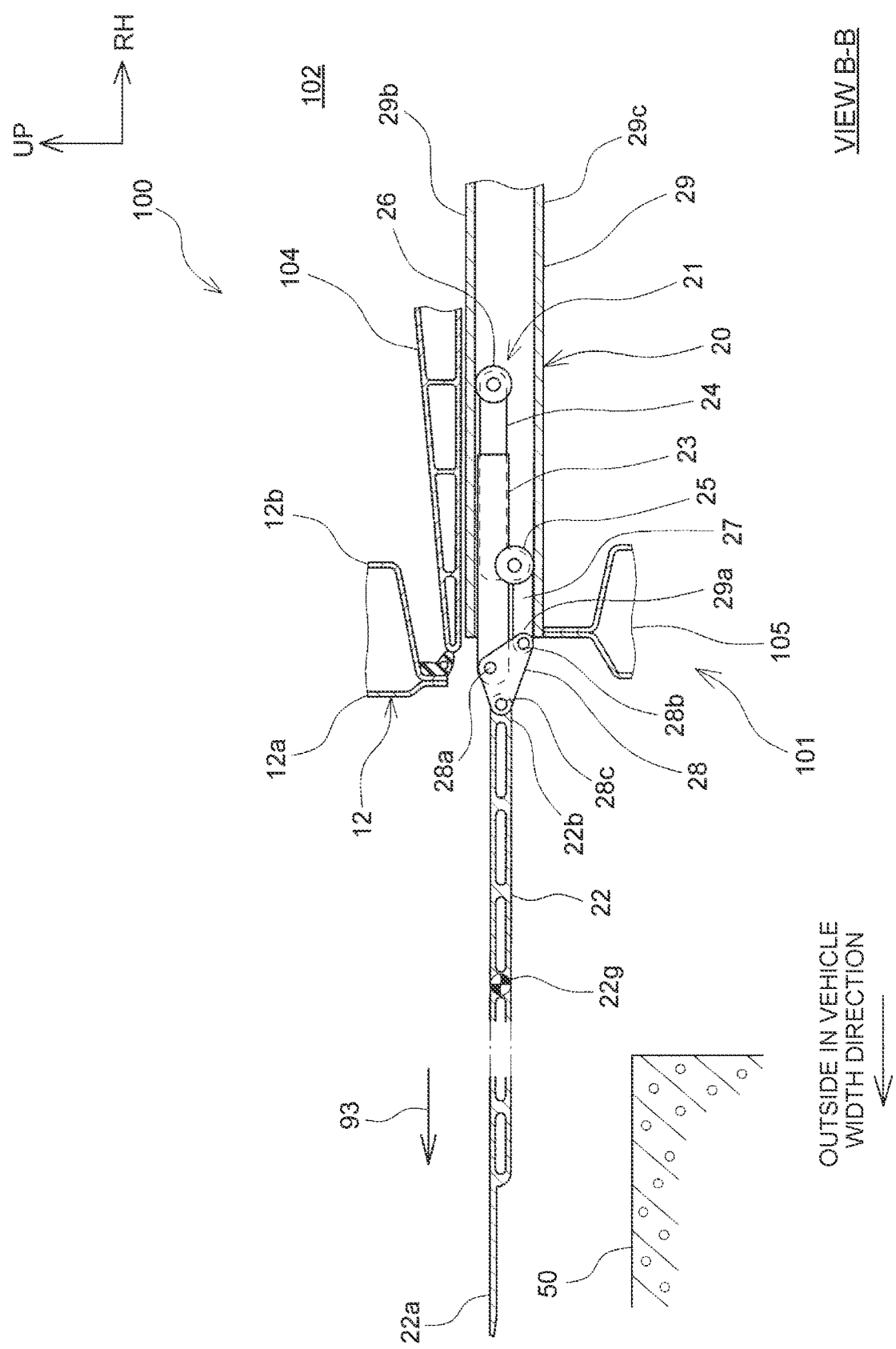
FIG. 7 is a sectional view taken along line B-B shown in FIG. 5, in a state where the slope plate has been ejected.

Also after the ground clearance has been adjusted, the control device 40 continues the action of ejecting the slope plate 22 to deploy the slope plate 22 to the outside in the vehicle width direction as indicated by arrow 93 in FIG. 7. When the position 22g of the center of gravity of the slope plate 22 reaches the outside of the opening 29a of the casing 29 in the vehicle width direction, the body-side end 22b of the slope plate 22 is engaged with a lock mechanism (not shown) and thereby locked so as not to rotate around the pin 28c. Then, ejection of the slope plate 22 in the substantially horizontal direction continues.

As shown in step S103 of FIG. 4 and FIG. 7, when the slope plate 22 has been ejected to the outside in the vehicle width direction, the rotary link 28 has protruded through the opening 29a to the outside in the vehicle width direction. The connection body 23 is engaged with an engaging member (not shown) of the casing 29 and locked on the casing 29 so as not to move further toward the outside in the vehicle width direction. When the rotary link 28 protrudes through the opening 29a toward the outside in the vehicle width direction, the lock mechanism (not shown) between the slider main body 24 and the connection body 23 is released, so that the slider main body 24 becomes able to move relatively to the connection body 23 in the vehicle width direction. Here, the body-side end 22b of the slope plate 22 remains in the state of being locked by the lock mechanism (not shown) so as not to rotate around the pin 28c.

Figure 8:
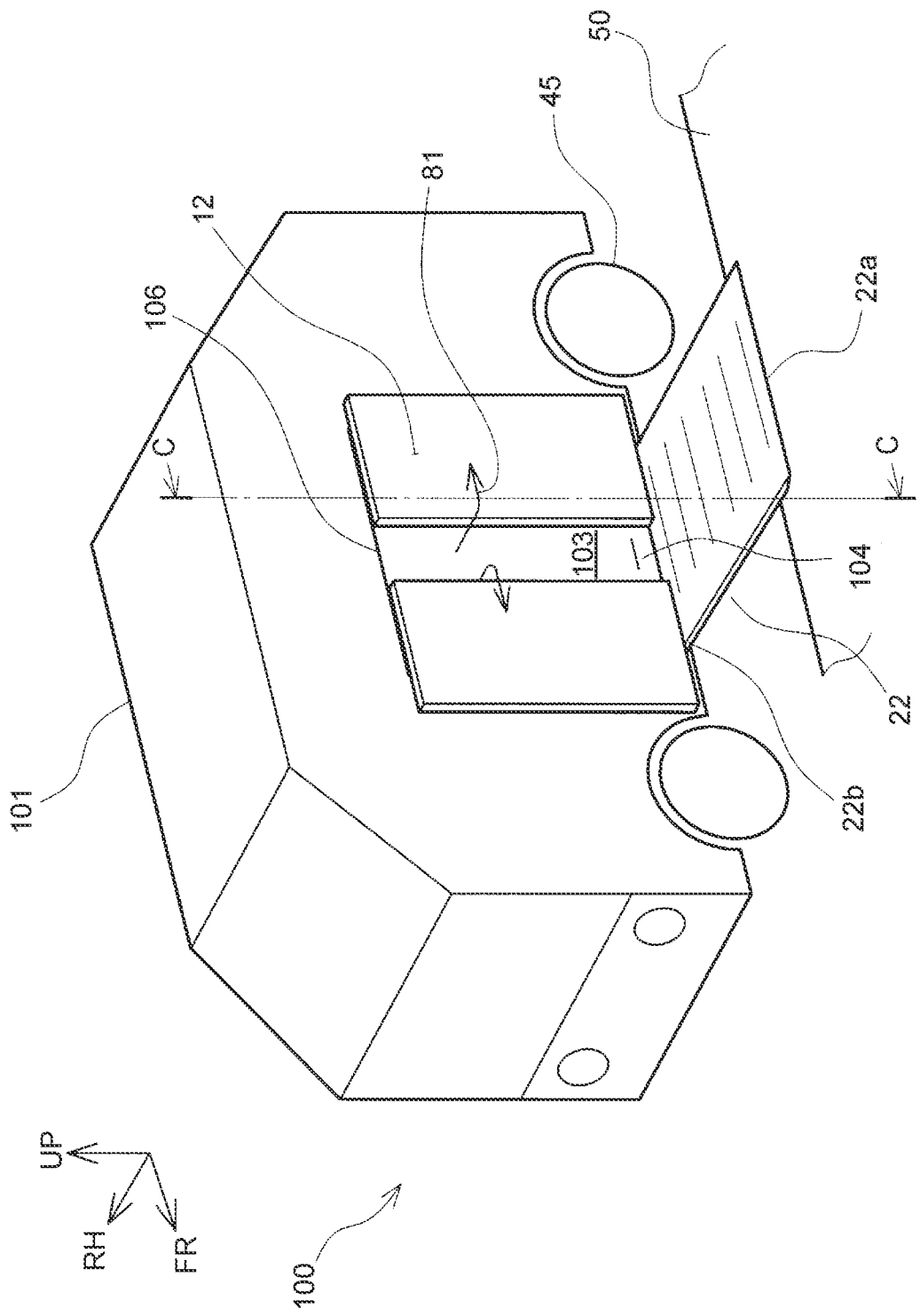
FIG. 8 is a perspective view showing a state where the door is slightly opened after the slope plate has been ejected in the vehicle shown in FIG. 1.
Figure 9:
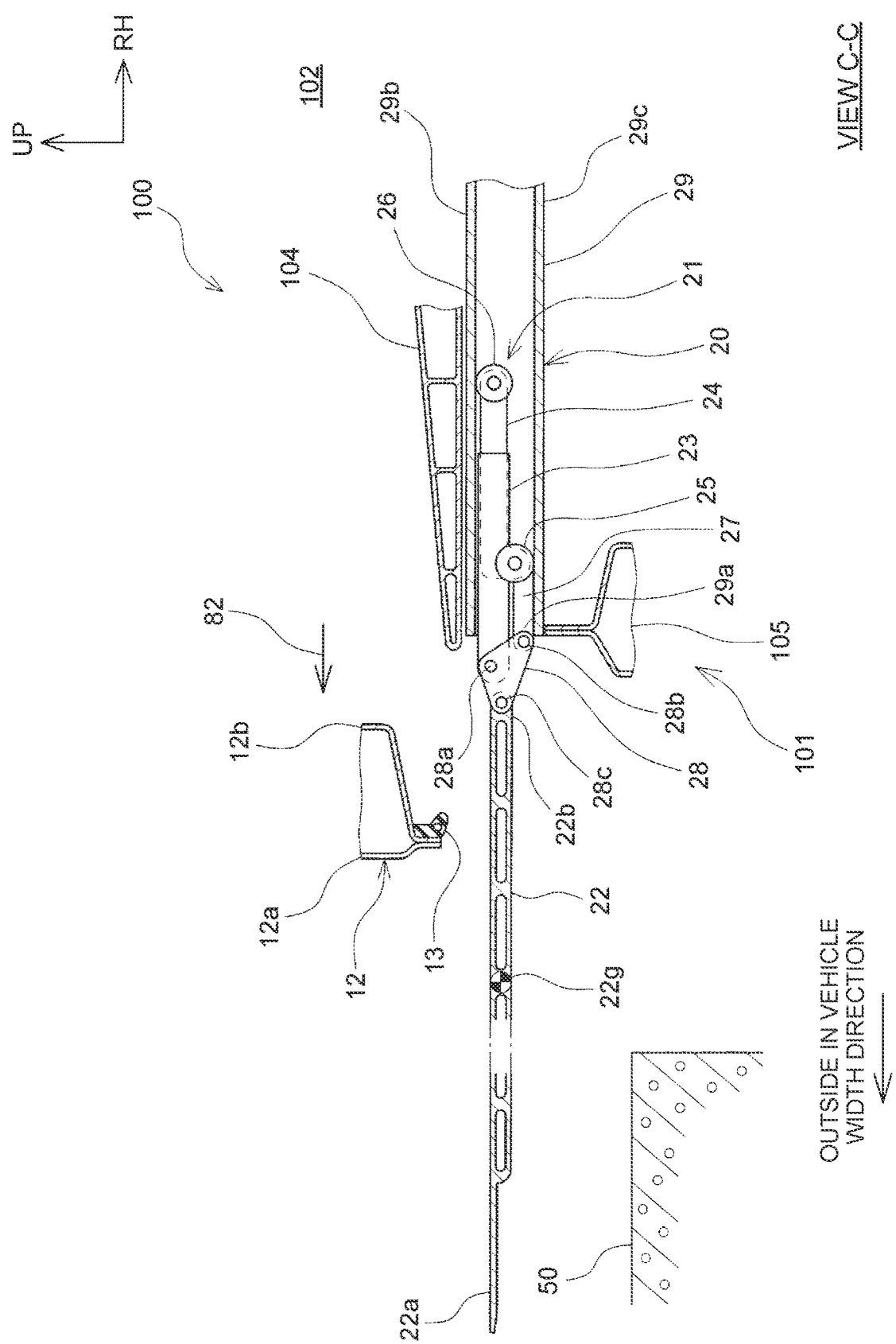
FIG. 9 is a sectional view taken along line C-C shown in FIG. 8.
Figure 10:
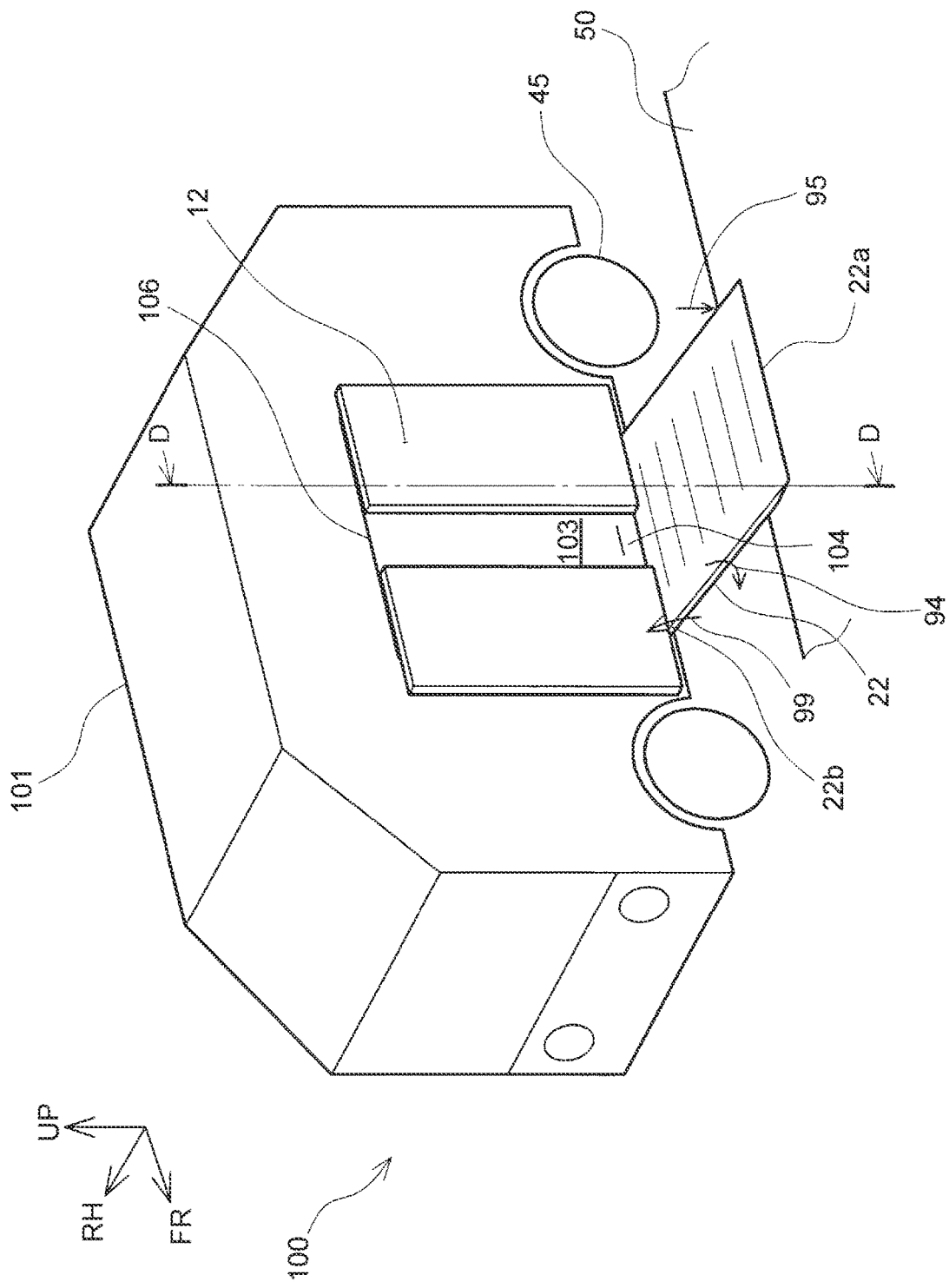
FIG. 10 is a perspective view showing a state where a body-side end of the slope plate is lifted and a leading end thereof is grounded on a sidewalk with the door slightly opened in the vehicle shown in FIG. 1.

When the slope plate 22 has been ejected to the outside in the vehicle width direction, the control device 40 starts opening the door 12 as shown in step S104 of FIG. 4. As shown in FIG. 8 and FIG. 9, the control device 40 outputs a command for slightly opening the door 12 to the door opening-closing mechanism 11. Based on this command, the door opening-closing mechanism 11 rotates the motor to slightly open the door 12.

As shown in FIG. 8, the door 12 is pushed out toward the outside in the vehicle width direction and slightly opened in the vehicle front-rear direction as indicated by arrows 81 in FIG. 8 and arrow 82 in FIG. 9 by a guide rail (not shown) and a link (not shown) of the door 12. As shown in FIG. 9, when the door 12 is slightly opened, the door 12 is pushed out toward the outside in the vehicle width direction and a gap is left between the tip of the seal lip of the weather seal 13 mounted at the lower end of the door 12 and the end of the step part 104 on the vehicle left side.

After slightly opening the door 12 so as to leave a gap between the tip of the seal lip of the weather seal 13 and the end of the step part 104 on the vehicle left side as shown in step S104 of FIG. 4, the control device 40 lifts the body-side end 22b of the slope plate 22 as shown in step S105 of FIG. 4. The control device 40 outputs a command for lifting the body-side end 22b of the slope plate 22 to the slope deploying mechanism 21. When this command is input, the slope deploying mechanism 21 rotates the motor to move the slider main body 24 toward the outside in the vehicle width direction relatively to the connection body 23.

Figure 11:
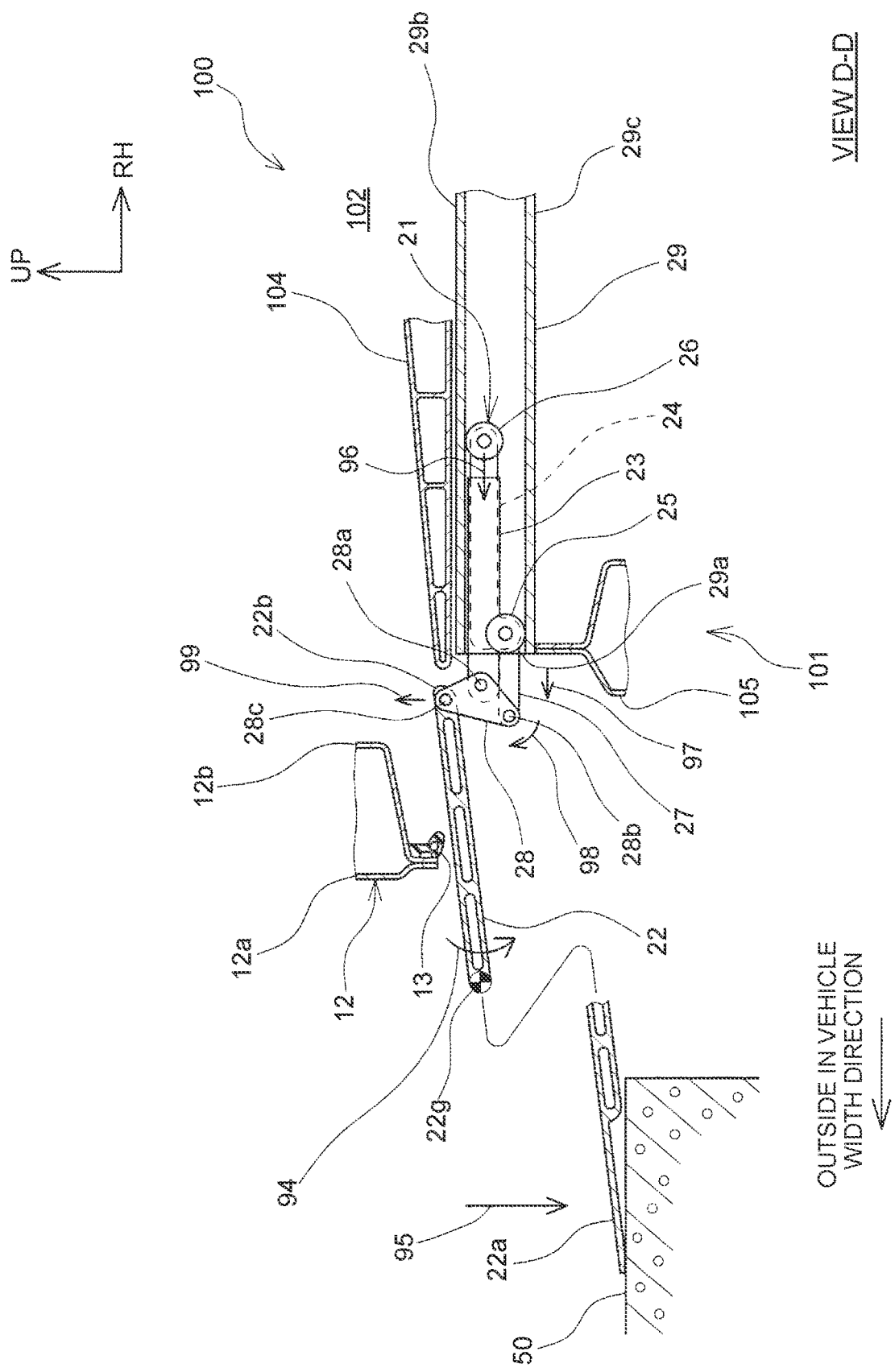
FIG. 11 is a sectional view taken along line D-D shown in FIG. 10.
Figure 12:
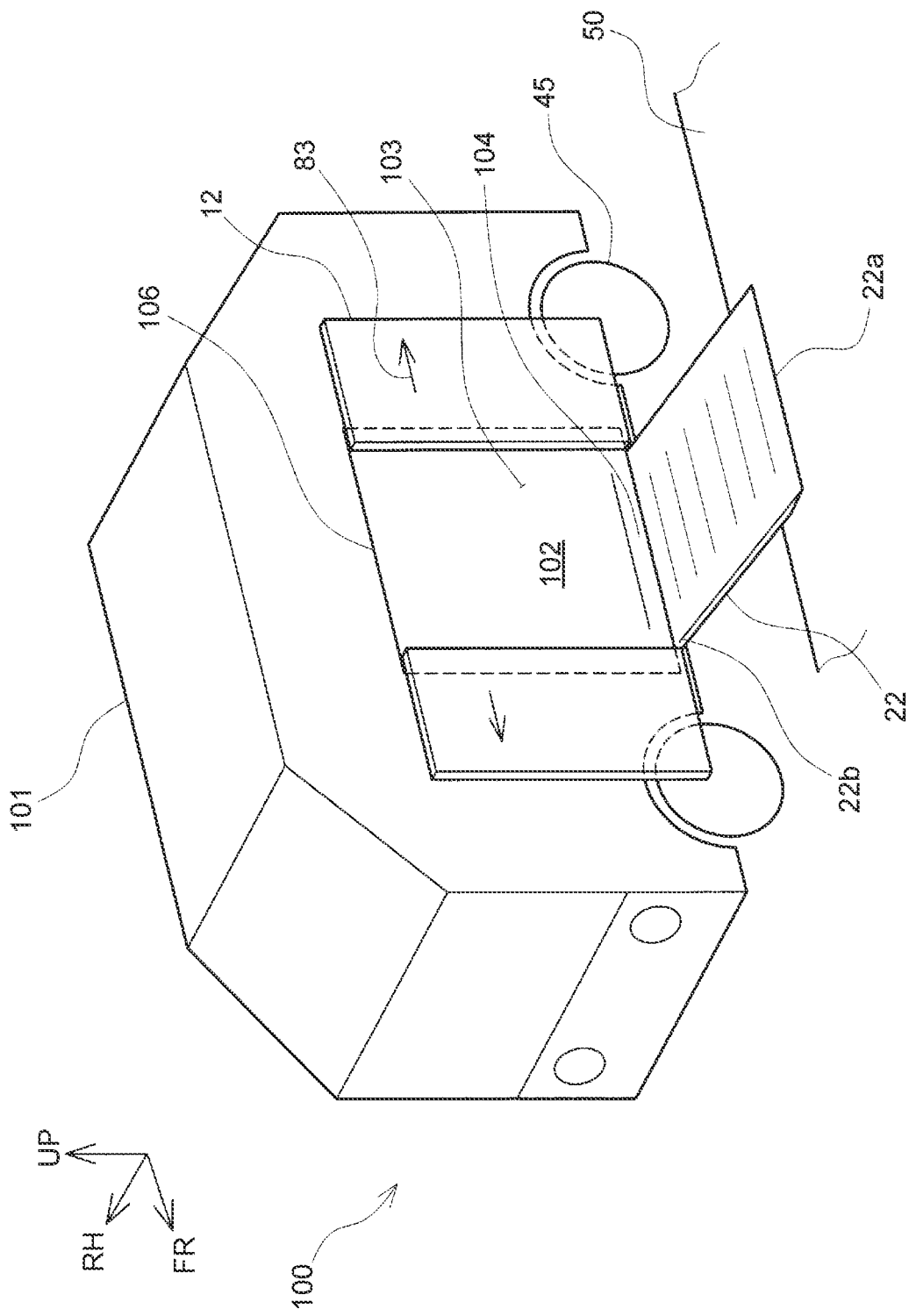
FIG. 12 is a perspective view showing a state where the slope plate is deployed and the door is fully opened in the vehicle shown in FIG. 1.

As described above, the connection body 23 is locked on the casing 29 so as not to move toward the outside in the vehicle width direction, while the slider main body 24 is movable toward the outside in the vehicle width direction relatively to the connection body 23. Therefore, when the slider main body 24 moves toward the outside in the vehicle width direction as the motor rotates, the slider main body 24 enters inside the connection body 23 and moves toward the outside in the vehicle width direction as shown in FIG. 11. This causes the connection bar 27 of the slider main body 24 to move toward the outside in the vehicle width direction and thereby move the pin 28b toward the outside in the vehicle width direction, which in turn causes the rotary link 28 to rotate clockwise as indicated by arrow 98 in FIG. 11. As the rotary link 28 thus rotates, the pin 28c thereof moves upward as indicated by arrow 99 in FIG. 11. As a result, the body-side end 22b of the slope plate 22 connected to the pin 28c moves upward.

When the slider main body 24 moves as shown in FIG. 11, the body-side end 22b of the slope plate 22 is disengaged from the lock mechanism and the slope plate 22 becomes able to rotate around the pin 28c. Since the position 22g of the center of gravity of the slope plate 22 is located on the outside of the opening 29a of the casing 29 in the vehicle width direction, when disengaged from the lock mechanism, the body-side end 22b of the slope plate 22 rotates around the pin 28c as indicated by arrow 94 shown in FIG. 10 and FIG. 11 such that the leading end 22a lowers. Then, as indicated by arrow 95 in FIG. 10 and FIG. 11, the leading end 22a of the slope plate 22 moves downward and the leading end 22a is grounded on a sidewalk 50.

The control device 40 moves the slider main body 24 toward the outside in the vehicle width direction until an upper surface of the body-side end 22b of the slope plate 22 becomes substantially flush with an upper surface of the step part 104 of the floor panel 103. When the upper surface of the body-side end 22b of the slope plate 22 becomes substantially flush with the upper surface of the step part 104, the control device 40 stops lifting the body-side end 22b of the slope plate 22. Thus, deployment of the slope plate 22 has been completed.

Upon completion of lifting, the control device 40 moves to step S106 of FIG. 4 and outputs a command for fully opening the door 12 that has been slightly opened to the door opening-closing mechanism 11. In accordance with this command, the door opening-closing mechanism 11 fully opens the door 12 as indicated by arrows 83 in FIG. 12. When the door 12 is fully opened, the vehicle cabin 102 with the flat floor panel 103 and an entrance 106 of the body 101 through which passengers get on and out of the vehicle are revealed. Passengers climb into the vehicle cabin 102 by crossing the slope plate 22 from the sidewalk 50.

As has been described above, the control device 40 of the vehicle 100 of the embodiment slightly opens the door 12 after ejecting the slope plate 22, which can reduce the likelihood that passengers may come into contact with the slope plate 22 while the slope plate 22 is deploying. Further, the control device 40 of the embodiment fully opens the door 12 after raising the slope plate 22, with the door 12 slightly opened, until the upper surface of the body-side end 22b of the slope plate 22 reaches the level of the upper surface of the step part 104 of the floor panel 103 and thus matching the levels of these upper surfaces. In other words, the control device 40 fully opens the door 12 after creating a state where the slope plate 22 has been deployed and there is no level difference between the upper surface of the slope plate 22 and the upper surface of the step part 104. Thus, passengers are less likely to start to cross the slope plate 22 before the position of the slope plate 22 is established. Moreover, even when passengers start to cross the slope plate 22 while the door 12 is not yet fully opened, they are less likely to trip due to a level difference.

Since the control device 40 of the embodiment deploys the slope plate 22 and adjusts the ground clearance at the same time, even when the ground clearance needs to be adjusted, the time from when the vehicle 100 stops until passengers start to get on and out of the vehicle 100 can be shortened. Further, when ejecting and deploying the slope plate 22 to the outside of the body 101 by the slope deploying mechanism 21, the control device 40 completes the adjustment of the ground clearance by the ground clearance adjusting mechanism 31 before the position 22g of the center of gravity of the slope plate 22 is sent out to the outside of the body 101. Thus, the ground clearance is adjusted with the leading end 22a of the slope plate 22 floating without being grounded, which can reduce the likelihood of interference between the action of deploying the slope plate 22 and the action of adjusting the ground clearance. Moreover, the control device 40 completes the adjustment of the ground clearance by the ground clearance adjusting mechanism 31 before the action of deploying the slope plate 22 is completed. Thus, the ground clearance is adjusted in a state where the body-side end 22b of the slope plate 22 is engaged with the lock mechanism (not shown) and thereby locked so as not to rotate around the pin 28c, and where the slope plate 22 extends in a substantially horizontal direction and the leading end 22a of the slope plate 22 is not grounded. This can reduce the likelihood of interference between the action of deploying the slope plate 22 and the action of adjusting the ground clearance.

Next, another operation of the control device 40 installed in the vehicle 100 will be described with reference to FIG. 13 to FIG. 19. This operation is an operation in which the door 12 is slightly opened first and then the slope plate 22 is deployed and the ground clearance is adjusted, and when the slope plate 22 has been ejected, the body-side end 22b of the slope plate 22 is lifted. Actions that are the same as those described with reference to FIG. 4 to FIG. 12 will be described in a simplified manner.

Figure 13:
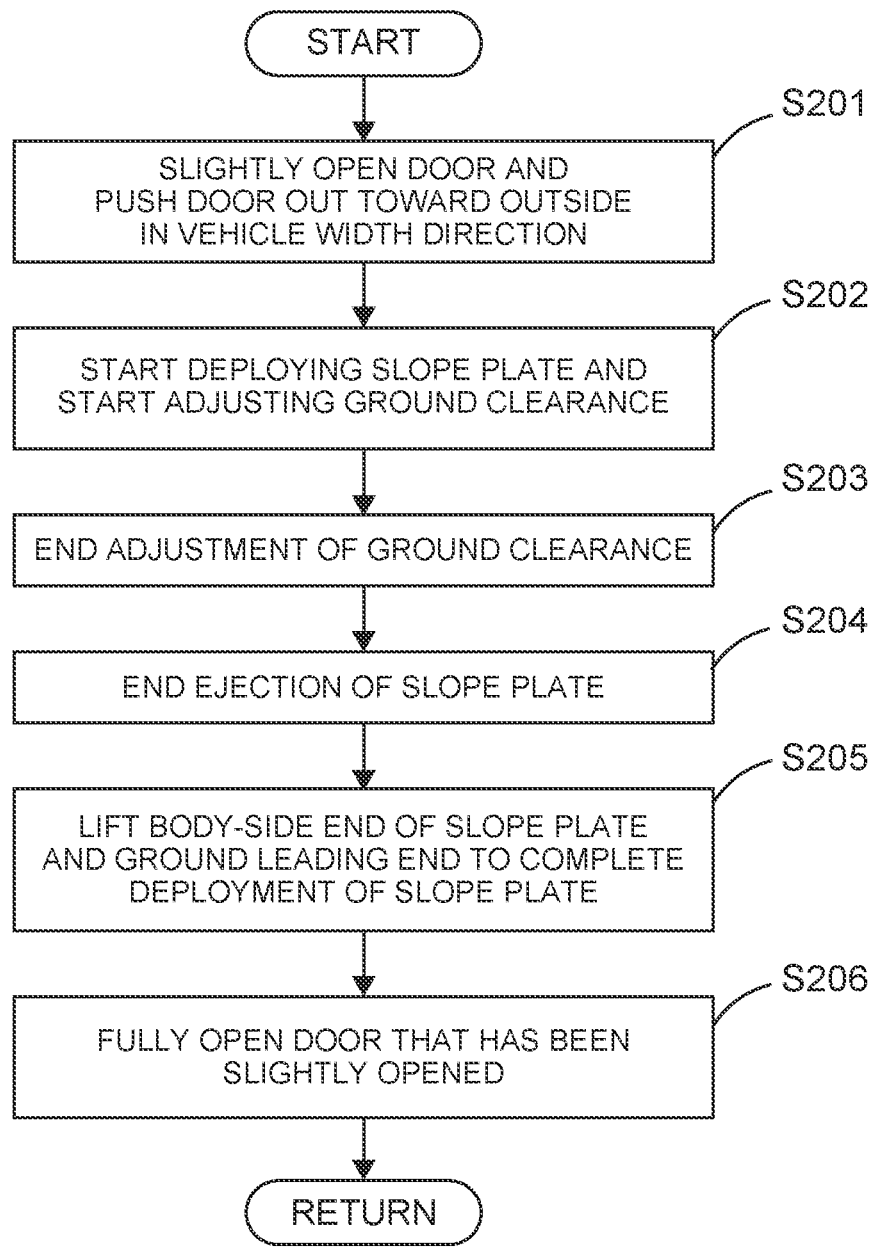
FIG. 13 is a flowchart showing another operation by the control device of the vehicle of the embodiment.
Figure 14:
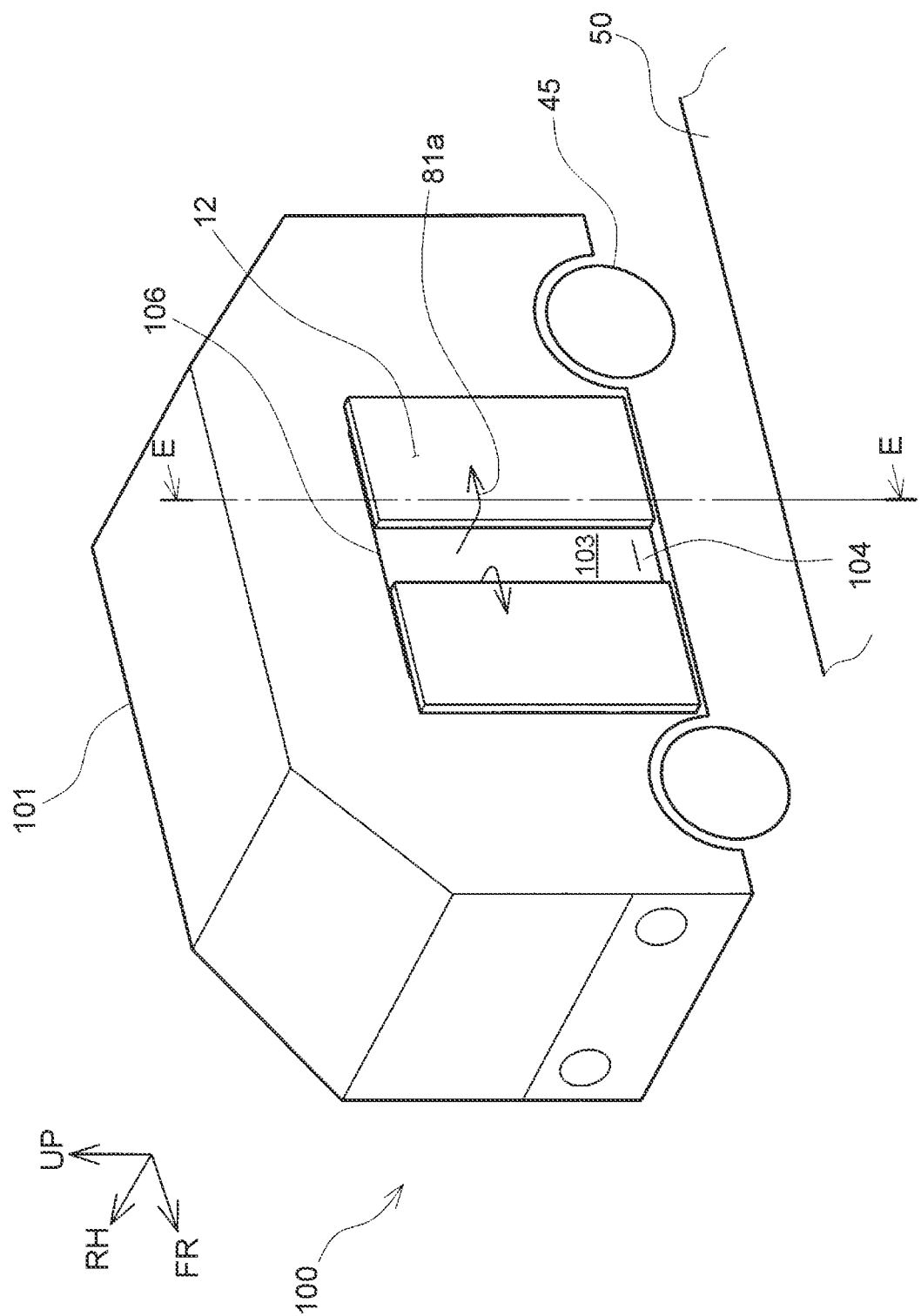
FIG. 14 is a perspective view showing a state where the door is slightly opened in the vehicle shown in FIG. 1.
Figure 15:
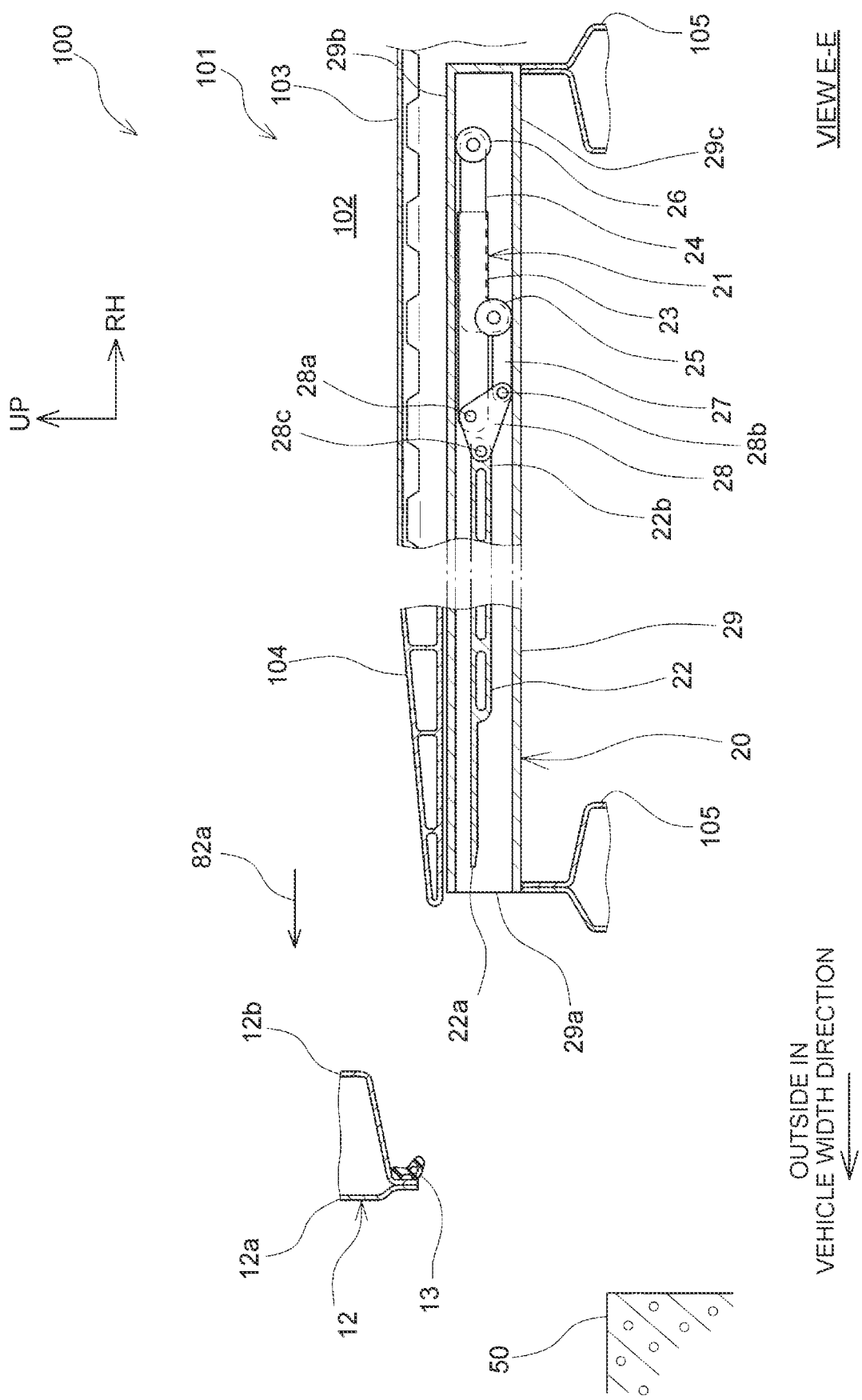
FIG. 15 is a sectional view taken along line E-E shown in FIG. 14.
Figure 16:
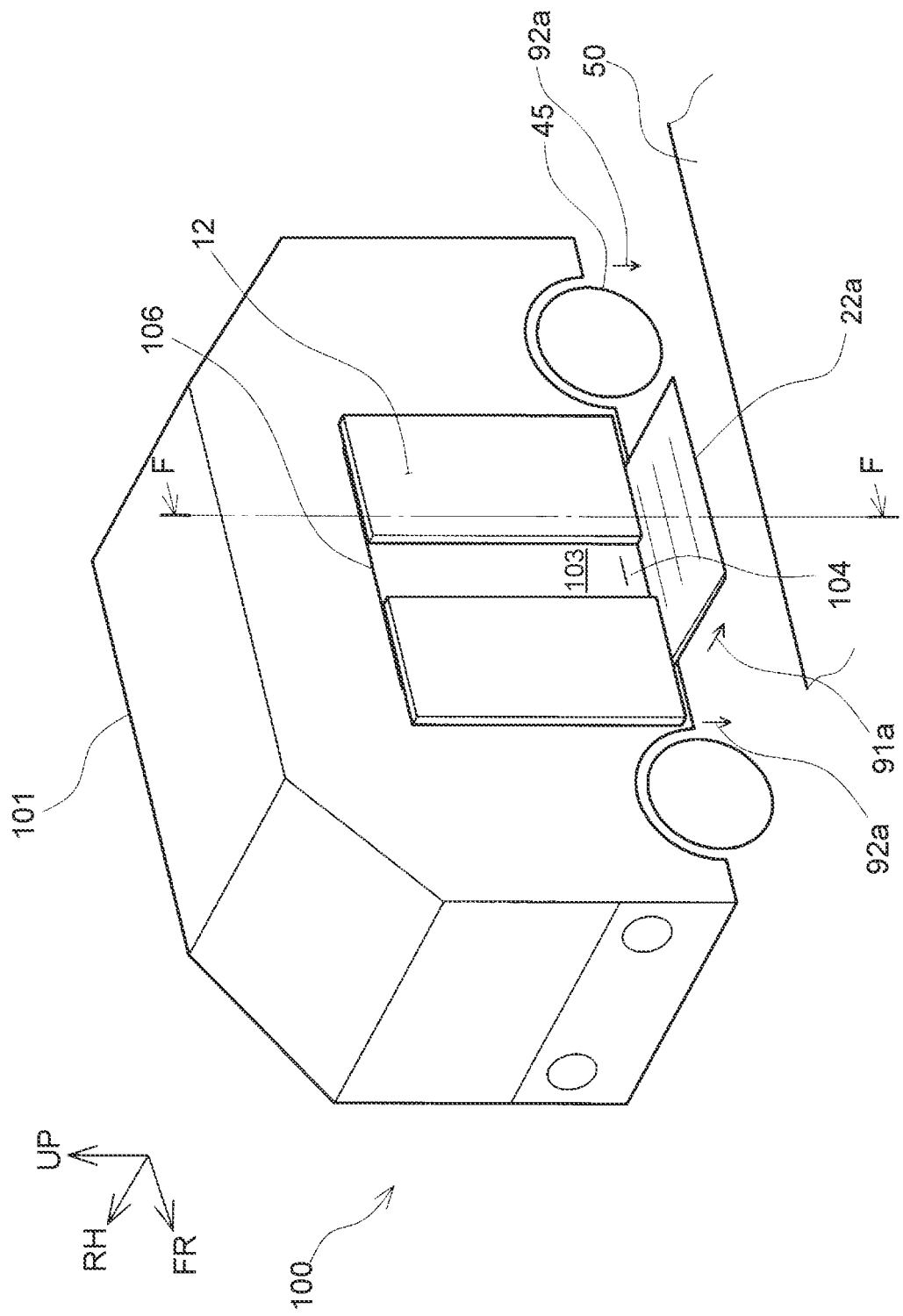
FIG. 16 is a perspective view showing a state where the slope plate is being deployed and the ground clearance is being adjusted with the door slightly opened in the vehicle shown in FIG. 1.
Figure 17:
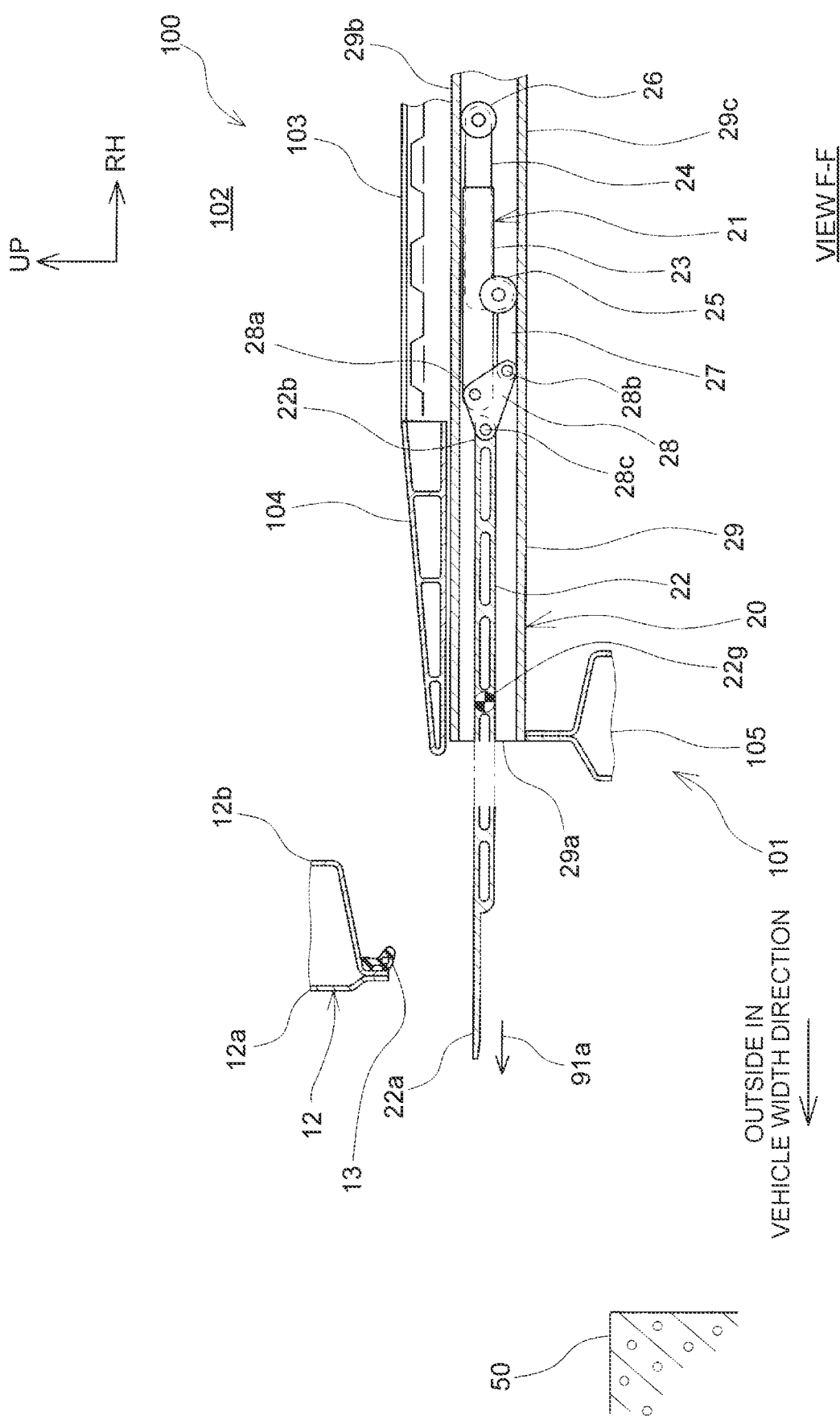
FIG. 17 is a sectional view taken along line F-F shown in FIG. 16.

When the vehicle 100 stops at a predetermined place, such as a bus stop, where passengers get on and out of the vehicle 100, the CPU 41 of the control device 40 slightly opens the door 12 as shown in step S201 of FIG. 13. The control device 40 outputs a command for slightly opening the door 12 to the door opening-closing mechanism 11. In accordance with this command, the door opening-closing mechanism 11 rotates the motor and slightly opens the door 12 as shown in FIG. 14 and FIG. 15. Details of an action after slightly opening the door 12 are the same as the action in step S104 of FIG. 4 described above.

As shown in FIG. 14 and FIG. 15, the door 12 is pushed out toward the outside in the vehicle width direction and slightly opened in the vehicle front-rear direction as indicated by arrows 81a in FIG. 14 and arrow 82a in FIG. 15 by the guide rail (not shown) and the link (not shown) of the door 12. As shown in FIG. 15, when the door 12 is slightly opened, the door 12 is pushed out toward the outside in the vehicle width direction and a gap is left between the tip of the seal lip of the weather seal 13 mounted at the lower end of the door 12 and the end of the step part 104 on the vehicle left side.

After slightly opening the door 12 so as to leave a gap between the tip of the seal lip of the weather seal 13 and the end of the step part 104 on the vehicle left side, the CPU 41 of the control device 40 outputs a command for starting to deploy the slope plate 22 to the slope deploying mechanism 21 as shown in step S202 of FIG. 13. Further, the CPU 41 of the control device 40 outputs a command for reducing the ground clearance of the vehicle 100 to the ground clearance adjusting mechanism 31. Accordingly, as in step S101 of FIG. 4 described above, the slope deploying mechanism 21 sends out the leading end 22a of the slope plate 22 through the opening 29a of the casing 29 toward the outside in the vehicle width direction as indicated by arrow 91a in FIG. 16 and FIG. 17. Thus, the slope plate 22 is ejected toward the outside in the vehicle width direction. The ground clearance adjusting mechanism 31 reduces the ground clearance as indicated by arrows 92a in FIG. 16. When the ground clearance has been reduced to a predetermined clearance, the control device 40 ends the adjustment of the ground clearance as shown in step S203 of FIG. 13.

Figure 18:
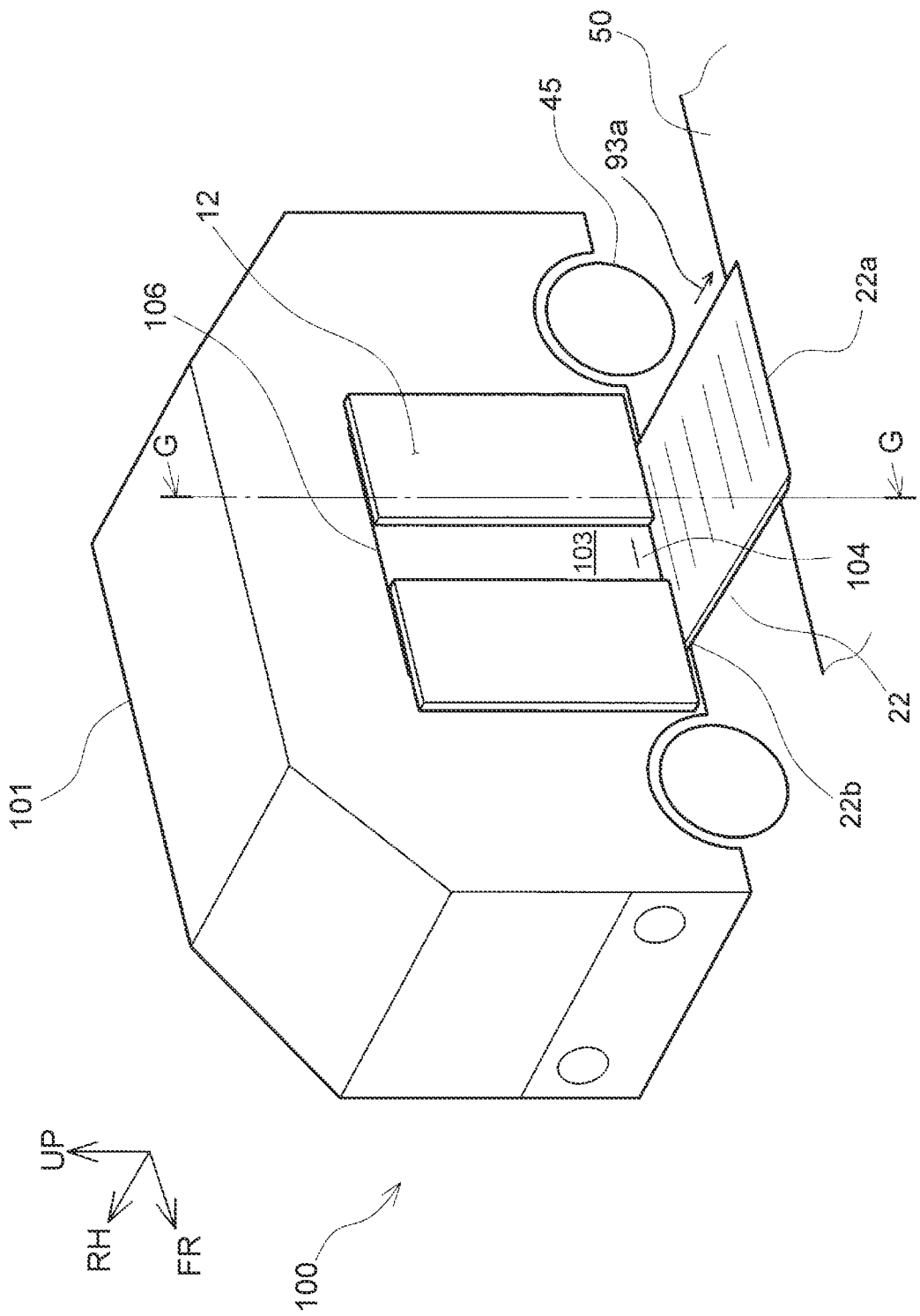
FIG. 18 is a perspective view showing a state where the slope plate has been ejected in the vehicle shown in FIG. 1.
Figure 19:
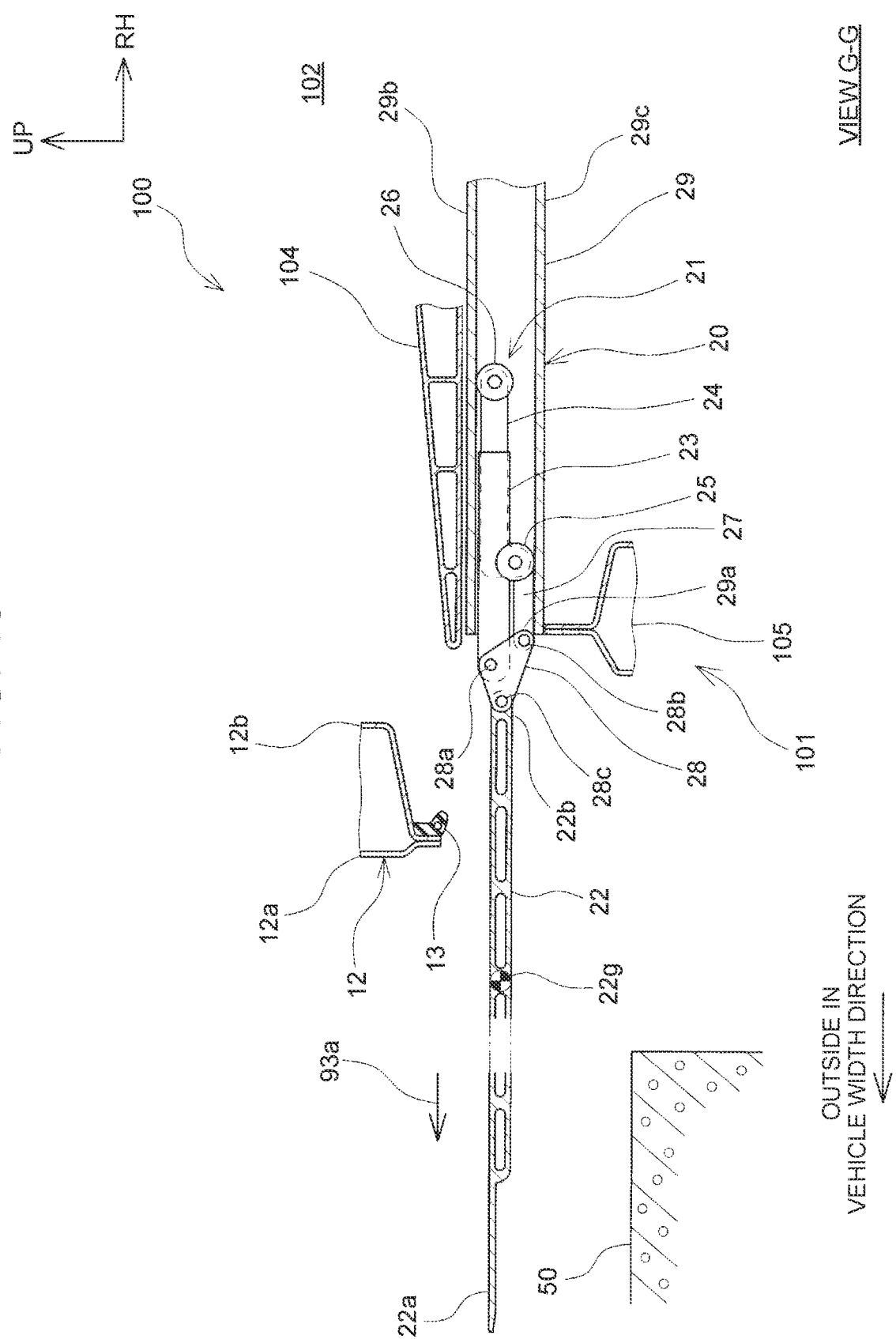
FIG. 19 is a sectional view taken along line G-G shown in FIG. 18.

As shown in FIG. 18 and FIG. 19, also after the ground clearance has been adjusted, the CPU 41 of the control device 40 continues the action of ejecting the slope plate 22 to deploy the slope plate 22 to the outside in the vehicle width direction as indicated by arrow 93a in FIG. 18 and FIG. 19. Here, the slope plate 22 is ejected substantially horizontally as described above with reference to FIG. 7.

When the slope plate 22 has been ejected to the outside in the vehicle width direction as shown in step S204 of FIG. 13, the CPU 41 of the control device 40 moves to step S205 of FIG. 13. By the same actions as in step S105 of FIG. 4 described above, the CPU 41 lifts the body-side end 22b of the slope plate 22 and grounds the leading end 22a of the slope plate 22 to complete the deployment of the slope plate 22.

When deployment of the slope plate 22 is completed, the CPU 41 of the control device 40 moves to step S206 of FIG.

13, and fully opens the door 12 by the same action as in step S106 of FIG. 4 described above.

In this way, the control device 40 fully opens the door 12 after creating a state where the slope plate 22 has been deployed and there is no level difference between the upper surface of the slope plate 22 and the upper surface of the step part 104. Thus, passengers are less likely to start to cross the slope plate 22 before the position of the slope plate 22 is established.

In the operation of the control device 40 having been described above, the slope plate 22 is deployed and the ground clearance is adjusted after the door 12 is slightly opened. However, the operation is not limited to this example. For example, deployment of the slope plate 22 and adjustment of the ground clearance may be started at the same time as the door 12 is slightly opened. Alternatively, adjustment of the ground clearance may be started at the same time as the door 12 is slightly opened, and deployment of the slope plate 22 may be started after the door 12 is slightly opened. Or deployment of the slope plate 22 may be started at the same time as the door 12 is slightly opened, and adjustment of the ground clearance may be started after the door 12 is slightly opened.

In the vehicle 100 having been described above, the control device 40 performs the action of deploying the slope plate 22 and the action of opening the door 12. However, without being limited to this example, deployment of the slope plate 22 and opening of the door 12 may be performed by manual operation or the like. In this case, the following method of activating the door 12 to open and close and the slope plate 22 to deploy can be used.

A method of activating the door 12 to open and close and the slope plate 22 to deploy of the embodiment is used in the vehicle 100 including: the body 101 having the vehicle cabin 102 in which passengers ride and the floor panel 103 constituting the floor of the vehicle cabin 102; the door opening-closing mechanism 11 that drives the door 12 mounted on the body 101 to open and close; and the slope deploying mechanism 21 that deploys the slope plate 22 housed under the floor panel 103 to the outside of the body 101. The method of activating the door 12 to open and close and the slope plate 22 to deploy involves opening the door 12 by the door opening-closing mechanism 11 after deploying the slope plate 22 toward the outside of the vehicle 100 by the slope deploying mechanism 21.

This method of activating the door 12 to open and close and the slope plate 22 to deploy may involve deploying the slope plate 22 to the outside of the body 101 by the slope deploying mechanism 21 to eject the slope plate 22, pushing the door 12 out toward the outside by the door opening-closing mechanism 11 to slightly open the door, then immediately raising the slope plate 22 by the slope deploying mechanism 21 until the upper surface of the body-side end 22b of the slope plate 22 reaches the level of the upper surface of the step part 104 of the floor panel 103, grounding the leading end 22a of the slope plate 22, and then fully opening the door 12 by the door opening-closing mechanism 11.

Further, this method of activating the door 12 to open and close and the slope plate 22 to deploy may involve pushing the door 12 out toward the outside by the door opening-closing mechanism 11 to slightly open the door, deploying the slope plate 22 to the outside of the body 101 by the slope deploying mechanism 21 to eject the slope plate 22, then immediately raising the slope plate 22 by the slope deploying mechanism 21 until the upper surface of the body-side end 22b of the slope plate 22 reaches the level of the upper surface of the step part 104 of the floor panel 103, grounding the leading end 22a of the slope plate 22, and then fully opening the door 12 by the door opening-closing mechanism 11.

In this method of activating the door 12 to open and close and the slope plate 22 to deploy, deployment of the slope plate 22 and adjustment of the ground clearance may be started at the same time as the door 12 is slightly opened. Alternatively, adjustment of the ground clearance may be started at the same time as the door 12 is slightly opened, and deployment of the slope plate 22 may be started after the door 12 is slightly opened. Or deployment of the slope plate 22 may be started at the same time as the door 12 is slightly opened, and adjustment of the ground clearance may be started after the door 12 is slightly opened.

The workings and effects of this method of activating the door 12 to open and close and the slope plate 22 to deploy are the same as the workings and effects of the control device 40 described above.

What is claimed is:

1. A control device of a vehicle installed in a vehicle including: a body having a vehicle cabin in which a passenger rides and a floor panel constituting a floor of the vehicle cabin; a door opening-closing mechanism that drives a door mounted on the body to open and close; and a slope deploying mechanism that deploys a slope plate housed under the floor panel to an outside of the body,
 the control device coordinating operation of the door opening-closing mechanism and the slope deploying mechanism, wherein:
 the control device opens the door by the door opening-closing mechanism after deploying the slope plate toward the outside of the body by the slope deploying mechanism; and
 the control device deploys the slope plate to the outside of the body by the slope deploying mechanism to eject the slope plate, pushes the door out toward the outside by the door opening-closing mechanism to slightly open the door, then immediately raises the slope plate by the slope deploying mechanism until an upper surface of a body-side end of the slope plate reaches a level of an upper surface of the floor panel, grounds a leading end of the slope plate, and then fully opens the door by the door opening-closing mechanism.

2. The control device of the vehicle according to claim 1, wherein:
 the control device is installed in the vehicle that further includes a ground clearance adjusting mechanism that adjusts a ground clearance; and
 when deploying the slope plate to the outside of the body by the slope deploying mechanism, the control device reduces the ground clearance by the ground clearance adjusting mechanism.

3. The control device of the vehicle according to claim 2, wherein, when deploying the slope plate to the outside of the body by the slope deploying mechanism, the control device reduces the ground clearance by the ground clearance adjusting mechanism before a position of a center of gravity of the slope plate is sent out to the outside of the body.

4. The control device of the vehicle according to claim 3, wherein the control device deploys the slope plate to the outside of the body by the slope deploying mechanism and, at the same time, reduces the ground clearance by the ground clearance adjusting mechanism to eject the slope plate, pushes the door out toward the outside by the door opening-closing mechanism to slightly open the door, then immediately raises the slope plate by the slope deploying mechanism until an upper surface of a body-side end of the slope plate reaches a level of an upper surface of the floor panel, grounds a leading end of the slope plate, and then fully opens the door by the door opening-closing mechanism.

5. A vehicle comprising:
- a body having a vehicle cabin in which a passenger rides and a floor panel constituting a floor of the vehicle cabin;
- a door opening-closing mechanism that drives a door mounted on the body to open and close;
- a slope deploying mechanism that deploys a slope plate housed under the floor panel to an outside of the body; and
- a control device that coordinates operation of the door opening-closing mechanism and the slope deploying mechanism, wherein:
- the control device opens the door by the door opening-closing mechanism after deploying the slope plate toward the outside of the body by the slope deploying mechanism; and
- the control device deploys the slope plate to the outside of the body by the slope deploying mechanism to eject the slope plate, pushes the door out toward the outside by the door opening-closing mechanism to slightly open the door, then immediately raises the slope plate by the slope deploying mechanism until an upper surface of a body-side end of the slope plate reaches a level of an upper surface of the floor panel, grounds a leading end of the slope plate, and then fully opens the door by the door opening-closing mechanism.

6. A method of activating a door to open and close and a slope plate to deploy in a vehicle including: a body having a vehicle cabin in which a passenger rides and a floor panel constituting a floor of the vehicle cabin; a door opening-closing mechanism that drives a door mounted on the body to open and close; and a slope deploying mechanism that deploys a slope plate housed under the floor panel to an outside of the body,
- the method involving opening the door by the door opening-closing mechanism after deploying the slope plate toward the outside of the body by the slope deploying mechanism, and
- the method involves deploying the slope plate to the outside of the body by the slope deploying mechanism to eject the slope plate, pushing the door out toward the outside by the door opening-closing mechanism to slightly open the door, then immediately raising the slope plate by the slope deploying mechanism until an upper surface of a body-side end of the slope plate reaches a level of an upper surface of the floor panel, grounding a leading end of the slope plate, and then fully opening the door by the door opening-closing mechanism.

* * * * *